(12) United States Patent  
Ide et al.

(10) Patent No.: US 11,002,972 B2  
(45) Date of Patent: May 11, 2021

(54) DISPLAY DEVICE, OPTICAL ELEMENT, AND METHOD OF PRODUCING OPTICAL ELEMENT

(71) Applicant: SEIKO EPSON CORPORATION, Tokyo (JP)

(72) Inventors: Mitsutaka Ide, Shiojiri (JP); Masatoshi Yonekubo, Suwagun-hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/827,873

(22) Filed: Mar. 24, 2020

(65) Prior Publication Data

US 2020/0310131 A1    Oct. 1, 2020

(30) Foreign Application Priority Data

Mar. 25, 2019    (JP) .............................. JP2019-056555

(51) Int. Cl.
| | |
|---|---|
| *G02B 27/01* | (2006.01) |
| *G02B 27/42* | (2006.01) |
| *G02B 13/00* | (2006.01) |

(52) U.S. Cl.
CPC ....... G02B 27/0172 (2013.01); G02B 13/004 (2013.01); G02B 27/4272 (2013.01); *G02B 2027/0107* (2013.01); *G02B 2027/0174* (2013.01); *G02B 2027/0178* (2013.01)

(58) Field of Classification Search
CPC ........ G02B 2027/0174; G02B 27/0172; G02B 2027/0105; G02B 2027/0109; G02B 2027/011; G02B 2027/0116; G02B 2027/0178; G02B 27/0103; G02B 5/32; G02B 2027/0118; G02B 2027/013; G02B 2027/0134; G02B 2027/0147;
(Continued)

(56) References Cited

U.S. PATENT DOCUMENTS

| | | |
|---|---|---|
| 5,898,511 A | 4/1999 | Mizutani et al. |
| 7,295,377 B2 * | 11/2007 | Edelmann ............ G02B 5/1814 345/8 |

(Continued)

FOREIGN PATENT DOCUMENTS

| | | |
|---|---|---|
| JP | H06-167615 A | 6/1994 |
| JP | 2008-191527 A | 8/2008 |

(Continued)

*Primary Examiner* — Collin X Beatty  
(74) *Attorney, Agent, or Firm* — Oliff PLC

(57) ABSTRACT

A display device according to the present disclosure includes a first optical unit having positive power, a second optical unit including a first diffraction element and having positive power, a third optical unit having positive power, and a fourth optical unit including a second diffraction element and having positive power, and the first to fourth optical units are provided along an optical path of imaging light emitted from an imaging light generating device. The second optical unit further includes a first member provided at one surface side of the first diffraction element, and a second member provided on a side of the first member opposite to a side where the first diffraction element is located, the first member is transmissive and has an elastic modulus of 50 GPa or greater, and the second member is transmissive and has optical power.

7 Claims, 16 Drawing Sheets

(58) Field of Classification Search
CPC .... G02B 2027/0169; G02B 2027/0194; G02B 27/0081; G02B 27/0176; G02B 27/4227; G02B 5/1814; G02B 5/1842; G02B 5/1861; G02B 27/4272; G02B 13/004; G02B 2027/0107; G03H 1/26; G03H 1/0248; G03H 1/0486; G03H 1/202; G03H 1/2645; G03H 2001/0415; G03H 2001/0439; G03H 2001/2247; G03H 2001/266; G03H 2222/18
USPC .......................................................... 359/733
See application file for complete search history.

(56) References Cited

U.S. PATENT DOCUMENTS

| | | | |
|---|---|---|---|
| 2006/0228073 A1* | 10/2006 | Mukawa | G02B 17/0856 385/31 |
| 2008/0186547 A1 | 8/2008 | Shimizu et al. | |
| 2010/0246008 A1* | 9/2010 | Murata | G02B 5/1857 359/576 |
| 2012/0038959 A1* | 2/2012 | Ciaudelli | G03H 1/2286 359/12 |
| 2012/0120494 A1* | 5/2012 | Takayama | G02B 27/4272 359/576 |
| 2013/0222384 A1* | 8/2013 | Futterer | G02B 5/32 345/426 |
| 2016/0161755 A1* | 6/2016 | Yonekubo | G02B 27/0081 345/8 |
| 2017/0261751 A1* | 9/2017 | Noguchi | G02B 5/32 |
| 2019/0056598 A1 | 2/2019 | Saito | |
| 2019/0235266 A1 | 8/2019 | Ide et al. | |

FOREIGN PATENT DOCUMENTS

| | | |
|---|---|---|
| JP | 2017-167181 A | 9/2017 |
| JP | 2019-035907 A | 3/2019 |
| JP | 2019-133132 A | 8/2019 |

* cited by examiner

DISPLAY DEVICE, OPTICAL ELEMENT, AND METHOD OF PRODUCING OPTICAL ELEMENT

The present application is based on, and claims priority from JP Application Serial Number 2019-056555, filed Mar. 25, 2019, the disclosure of which is hereby incorporated by reference herein in its entirety.

BACKGROUND

1. Technical Field

The present disclosure relates to a display device, an optical element, and a method of producing an optical element.

2. Related Art

As a display device including a diffraction element such as a holographic element, a display device has been proposed in which imaging light emitted from an imaging light generating device is deflected toward an eye of an observer by a diffraction element. Interference fringes are optimized in the diffraction element to obtain an optimum diffraction angle and optimum diffraction efficiency at a specific wavelength. However, the imaging light has a predetermined spectral width centered at a specific wavelength, and thus, light with a peripheral wavelength deviated from the specific wavelength may cause a decrease in resolution of an image. Thus, a display device has been proposed in which imaging light emitted from the imaging light generating device is directed by a first diffraction element of the reflective type toward a second diffraction element disposed in front of the first diffraction element and in which the second diffraction element deflects, toward the eye of the observer, the imaging light emitted from the first diffraction element. According to the configuration, the first diffraction element can compensate for light having a peripheral wavelength and cancel a color aberration, and a decrease in resolution of an image due to the light having the peripheral wavelength deviated from a specific wavelength can be suppressed (for example, see JP-A-2017-167181 described below).

It is conceivable to provide optical power required for wavelength compensation by using diffractive power of the first diffraction element and refractive power of a lens member having optical power and provided on one surface side of the first diffraction element. However, upon exposure of interference fringes of the first diffraction element, refraction at the curved surface of the lens member greatly affects the exposure. As a result, the exposure is performed with a wavefront that is different from an original wavefront. The interference fringes formed during the exposure affected by refraction by the lens member result in blur in the imaging light emitted to an exit pupil, and as a result, a problem of reduced resolution arises.

It is also conceivable to use plastics as a material of the lens member to reduce the weight of the lens member. However, when a plastic lens is used, the diffraction element is expanded or contracted during exposure, and as a result, desired diffraction performance cannot be achieved.

SUMMARY

In order to solve the above-described problem, a display device according to an aspect of the present disclosure includes a first optical unit having positive power, a second optical unit including a first diffraction element and having positive power, a third optical unit having positive power, and a fourth optical unit including a second diffraction element and having positive power, the first to fourth optical units are provided along an optical path of imaging light emitted from an imaging light generating device, the second optical unit further includes a first member provided at one surface side of the first diffraction element, and a second member provided on a side of the first member opposite to a side where the first diffraction element is located, the first member is transmissive and has an elastic modulus of 50 GPa or greater, and the second member is transmissive and has optical power.

In the display device according to the aspect, the first member may be formed from glass.

In the display device according to the aspect, a surface of the first member opposite to the first diffraction element may be a flat surface.

In the display device according to the aspect, a gap may be formed between the first member and the second member.

The display device according to the aspect may further include a spacer member forming a gap between the first member and the second member.

In the display device according to the aspect, the spacer member may be provided integrally with the second member.

In the display device according to the aspect, the second member may include a light shielding member provided at a surface of the second member facing the first member.

An optical element according to an aspect of the present disclosure includes a first diffraction element, a first member provided at one surface side of the first diffraction element, and a second member provided on a side of the first member opposite to a side where the first diffraction element is located, and the first member is transmissive and has an elastic modulus of 50 GPa or greater, and the second member is transmissive and has optical power.

In the optical element according to the aspect, the first member may be formed from glass.

In the optical element according to the aspect, a surface of the first member opposite to the first diffraction element may be a flat surface.

In the optical element according to the aspect, a gap may be formed between the first member and the second member.

The optical element according to the aspect may further include a spacer member forming a gap between the first member and the second member.

In the optical element according to the aspect, the spacer member may be provided integrally with the second member.

In the optical element according to the aspect, the second member may include a light shielding member provided at a surface of the second member facing the first member.

A method of producing an optical element according to an aspect of the present disclosure includes providing a hologram material layer for forming a hologram element on a first member that is transmissive and has an elastic modulus of 50 GPa or greater, performing interference exposure by irradiating, with object light and reference light, the hologram material layer on the first member, and providing a second member on a side, of the hologram element formed on the first member by the interference exposure, opposite to a side where the first member is located.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
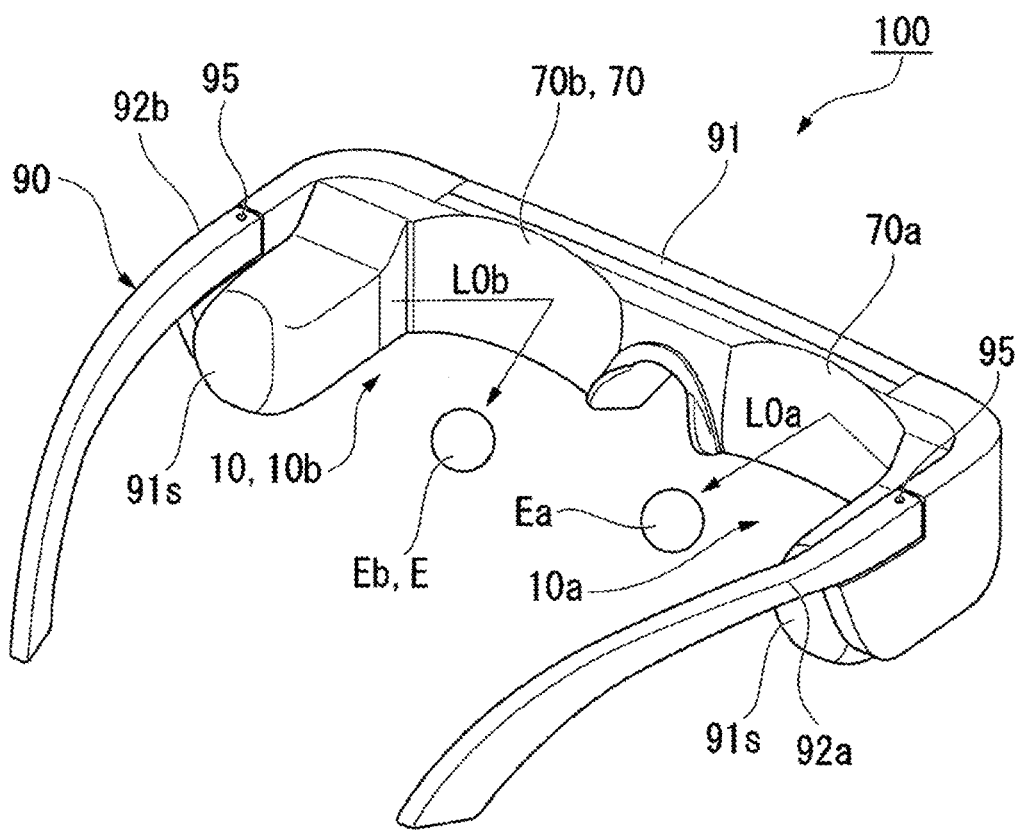
FIG. 1 is an external view of a display device according to a first exemplary embodiment.
Figure 1:
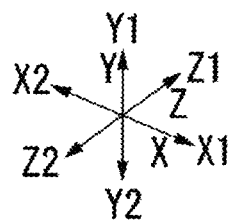
Figure 2:
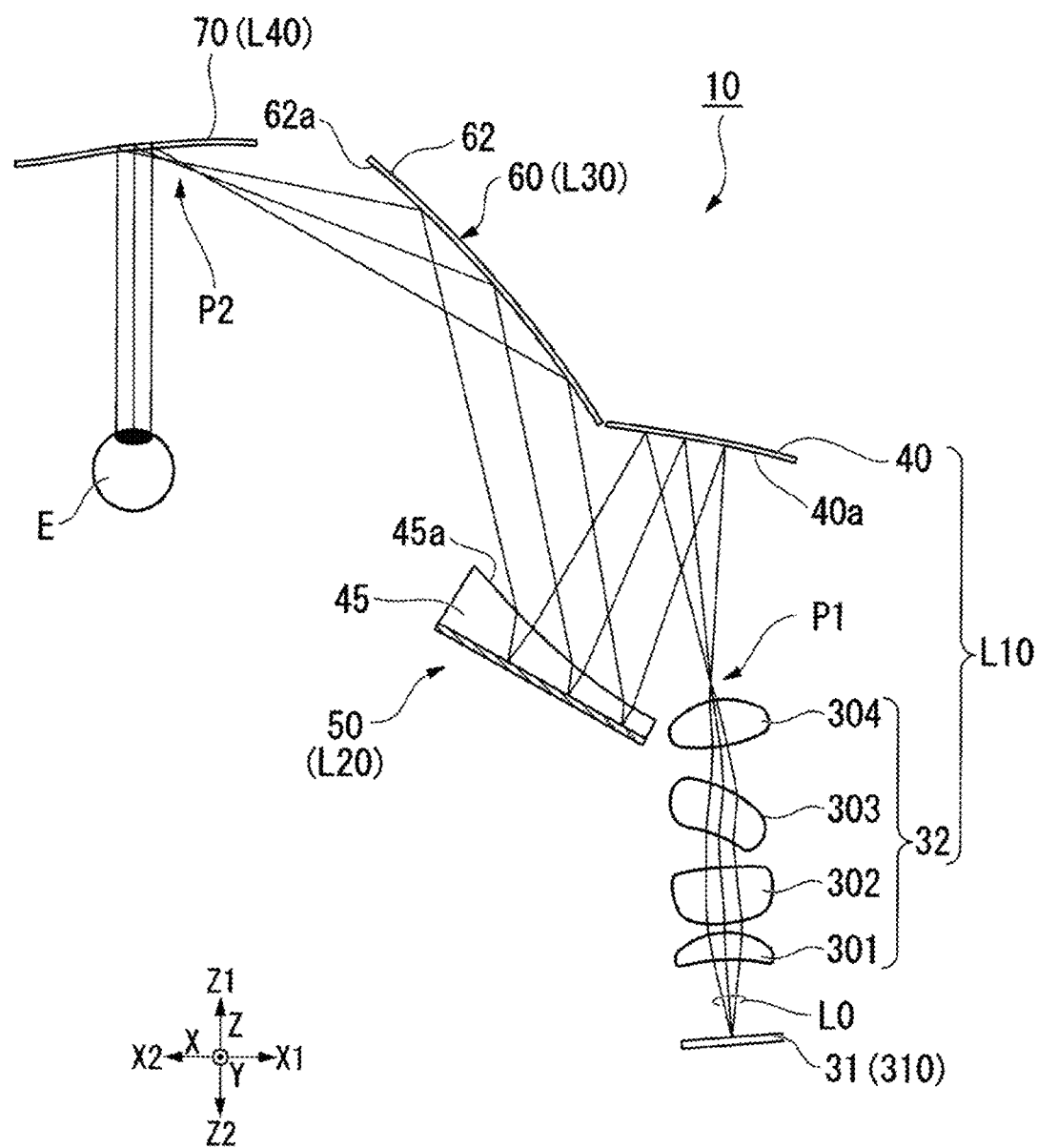
FIG. 2 is a schematic diagram of an optical system of the display device.

FIG. 1 is an external view illustrating an aspect of a visual appearance of a display device 100 according to the present exemplary embodiment. FIG. 2 is a schematic diagram illustrating one aspect of an optical system 10 of the display device 100 illustrated in FIG. 1. Note that, as necessary in the drawings used in the following description, a front and rear direction of an observer wearing the display device is a direction along a Z axis, the front of the observer wearing the display device is a front side Z1 as one side in the front and rear direction, and the rear of the observer wearing the display device is a rear side Z2 as the other side in the front and rear direction. A left and right direction with respect to the observer wearing the display device is defined as a direction along an X axis, one side in the left and right direction corresponding to the right direction of the observer wearing the display device is defined as a front side X1, and the other side in the left and right direction corresponding to the left direction of the observer wearing the display device is defined as a left side X2. An up and down direction with respect to the observer wearing the display device is defined as a direction along a Y axis, one side in the up and down direction corresponding to the up direction of the observer wearing the display device is defined as an up side Y1, and the other side in the up and down direction corresponding to the down direction of the observer wearing the display device is defined as a down side Y2.

The display device 100 illustrated in FIG. 1 is a head-mounted display device, and includes a right-eye optical system 10a that causes imaging light L0a to be incident on a right eye Ea and a left-eye optical system 10b that causes imaging light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted to the head of the observer by the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components such as an imaging light projecting device that constitute the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

Next, a basic configuration of the optical system 10 of the display device 100 will be described with reference to FIG. 2.

As illustrated in FIG. 2, in the optical system 10 in the present exemplary embodiment, a first optical unit L10 having positive power, a second optical unit L20 having positive power, a third optical unit L30 having positive power, and a fourth optical unit L40 having positive power are disposed along an optical path of imaging light L0 emitted from an imaging light generating device 31.

In the present exemplary embodiment, the first optical unit L10 having positive power is constituted of a mirror 40 and a projection optical system 32. The second optical unit (optical element) L20 having positive power includes a reflection-type first diffraction element 50 and a correction optical system 45. The third optical unit L30 having positive power is constituted of a light-guiding system 60. The fourth optical unit L40 having positive power is constituted of a reflection-type second diffraction element 70. In the present exemplary embodiment, the first diffraction element 50 and the second diffraction element 70 are reflection-type diffraction elements.

In the optical system 10, with focus on a traveling direction of the imaging light L0, the imaging light generating device 31 emits the imaging light L0 toward the projection optical system 32, and the projection optical system 32 emits the incident imaging light L0 toward the mirror 40. The mirror 40 includes a reflection surface 40a and reflects the imaging light L0 toward the first diffraction element 50. The imaging light L0 reflected by the reflection surface 40a of the mirror 40 passes through the correction optical system 45 and is incident on the first diffraction element 50. The imaging light L0 diffracted by the first diffraction element 50 is emitted toward the light-guiding system 60. The light-guiding system 60 emits the incident imaging light L0 toward the second diffraction element 70, and the second diffraction element 70 emits the incident imaging light L0 toward the eye E of the observer.

In the present exemplary embodiment, the imaging light generating device 31 generates imaging light L0.

An aspect may be adopted where the imaging light generating device 31 includes a display panel 310 such as an organic electroluminescent display element. The aspect can provide a small-sized display device 100 capable of displaying a high-quality image. An aspect may be adopted where the imaging light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the imaging light L0. Herein, an aspect may be adopted where the imaging light generating device 31 includes one display panel 310 that enables color display. Another aspect may be adopted where the imaging light generating device 31 includes a plurality of display panels 310 corresponding to respective colors and a synthesis optical system that synthesizes imaging light in respective colors emitted from the plurality of display panels 310. Furthermore, an aspect may be adopted where the imaging light generating device 31 modulates laser light using a micro-mirror device. In this case, imaging light is generated by scanning the laser light by driving the micro-mirror device.

The projection optical system 32 is an optical system that projects the imaging light L0 generated by the imaging light generating device 31, and is constituted of a first lens 301, a second lens 302, a third lens 303, and a fourth lens 304. The first lens 301, the second lens 302, the third lens 303, and the fourth lens 304 are constituted of a free-form lens or a rotationally symmetrical lens. The projection optical system 32 may be an eccentric optical system. In the example illustrated in FIG. 2, the number of lenses in the projection optical system 32 is four, but the number of lenses is not limited thereto. The projection optical system 32 may include five or more lenses. The lenses may be stuck together to form the projection optical system 32.

The light-guiding system 60 includes a mirror 62 with a reflection surface 62a that is more recessed at the center than at peripheral portions. The light-guiding system 60 has positive power. The mirror 62 includes a reflection surface 62a inclined obliquely in the front and rear direction. The reflection surface 62a includes a spherical surface, an aspherical surface, a free-form surface, or the like. In the present exemplary embodiment, the mirror 62 is a total reflection mirror with the reflection surface 62a including a free-form surface. However, the mirror 62 may be a half mirror, and in this case, the range in which external light is visible can be widened.

Now, a configuration of the second optical unit L20 including the first diffraction element 50 and a configuration of the fourth optical unit L40 including the second diffraction element 70 will be described.

First, the configuration of the fourth optical unit L40 will be described. In the following description, a configuration of the second diffraction element 70 constituting the fourth optical unit L40 will be mainly described.

Figure 3A:
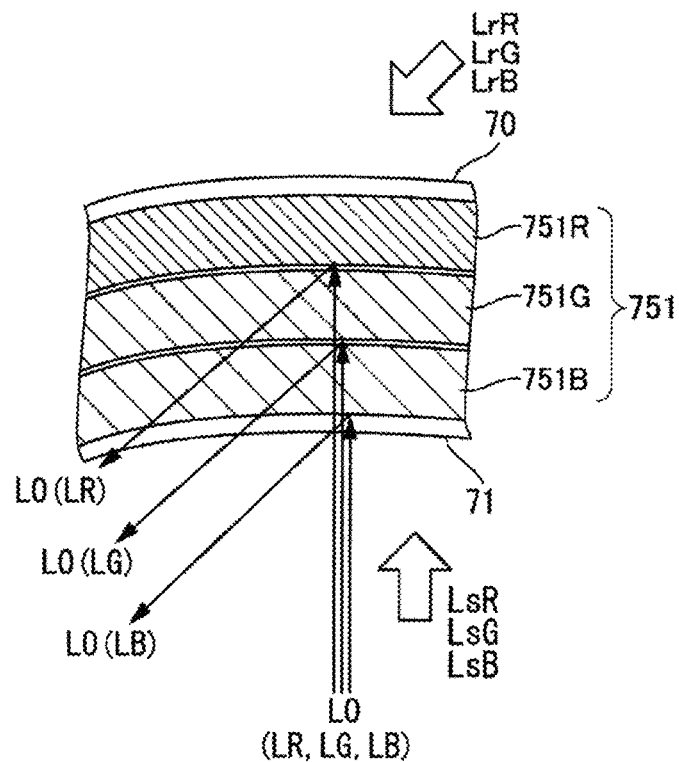
FIG. 3A is a schematic diagram of interference fringes of a diffraction element.

FIG. 3A is a schematic diagram of interference fringes 751 of the second diffraction element 70 illustrated in FIG. 2. As illustrated in FIG. 3A, the second diffraction element 70 is a partial reflection-type diffraction optical element constituted of a reflection-type volume hologram element. Thus, the second diffraction element 70 constitutes a partial transmissive reflective combiner. Therefore, external light is also incident on the eye E via the second diffraction element 70, and thus the observer can recognize an image in which the imaging light L0 formed by the imaging light generating device 31 and the external light (background) are superimposed on each other.

The second diffraction element 70 faces the eye E of the observer. An incident surface 71 of the second diffraction element 70 on which the imaging light L0 is incident has a concave surface being recessed in a direction away from the eye E. In other words, the incident surface 71 has a shape having a central portion recessed and curved with respect to a peripheral portion in the incident direction of the imaging light L0. Thus, the imaging light L0 can be efficiently condensed toward the eye E of the observer.

The second diffraction element 70 includes the interference fringes 751 with a pitch corresponding to a specific wavelength. The interference fringes 751 are recorded as a difference in refractive index and the like in a holographic photosensitive layer. The interference fringes 751 are inclined in one direction with respect to the incident surface 71 of the second diffraction element 70 so as to correspond to a specific incident angle. Therefore, the second diffraction element 70 diffracts and deflects the imaging light L0 in a predetermined direction. The specific wavelength and the specific incident angle respectively correspond to a wavelength and an incident angle of the imaging light L0. The interference fringes 751 having the configuration can be formed by performing interference exposure on the holographic photosensitive layer by using reference light Lr and object light Ls.

In the present exemplary embodiment, the imaging light L0 is used for color display, and thus includes red light LR, green light LG, and blue light LB, which will be described later. Thus, the second diffraction element 70 includes the interference fringes 751R, 751G, and 751B having a pitch corresponding to the specific wavelength. For example, the interference fringes 751R are formed, for example, at a pitch corresponding to the red light LR with a wavelength of 615 nm included in a wavelength range from 580 nm to 700 nm. The interference fringes 751G are formed, for example, at a pitch corresponding to the green light LG with a wavelength of 535 nm included in a wavelength range from 500 nm to 580 nm. The interference fringes 751B are formed, for example, at a pitch corresponding to the blue light LB with a wavelength of 460 nm, for example, in a wavelength range from 400 nm to 500 nm. The configuration can be formed by forming a holographic photosensitive layer having sensitivity corresponding to the respective wavelengths, and performing dual beam interference exposure on the holographic photosensitive layer by using reference light LrR, LrG, and LrB and object light LsR, LsG, and LsB having the respective wavelengths.

Figure 3B:
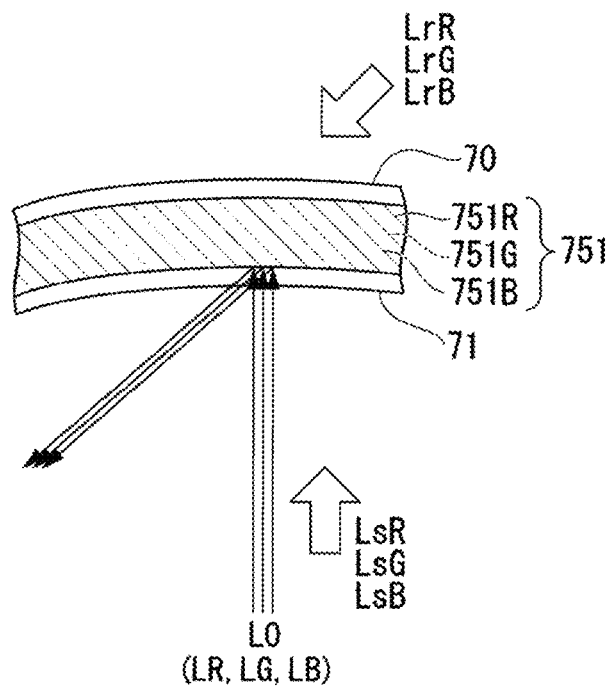
FIG. 3B is a schematic diagram of a different embodiment of interference fringes of a diffraction element.

Note that, as illustrated in FIG. 3B, the interference fringes 751 in which the interference fringes 751R, 751G, and 751B are superimposed on each other in one layer may be formed by dispersing a photosensitive material having sensitivity corresponding to the respective wavelengths in the holographic photosensitive layer, and then performing interference exposure on the holographic photosensitive layer by using the reference light LrR, LrG, and LrB and the object light LsR, LsG, and LsB having the respective wavelengths. Further, light having a spherical wave may be used as the reference light LrR, LrG, and LrB and the object light LsR, LsG, and LsB.

Next, the configuration of the second optical unit L20 will be described.

Figure 4:
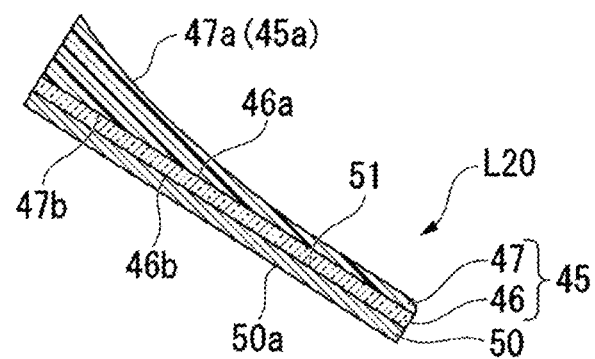
FIG. 4 is a cross-sectional view illustrating a general configuration of a second optical unit.

FIG. 4 is a cross-sectional view illustrating a general configuration of a second optical unit L20. As illustrated in FIG. 4, the second optical unit L20 includes the first diffraction element 50 and the correction optical system 45. The first diffraction element 50 is constituted of a reflection-type volume hologram element having a basic configuration that is the same as the second diffraction element 70. Thus the first diffraction element 50 includes interference fringes 50a having a pitch corresponding to a specific wavelength.

In the present exemplary embodiment, the first diffraction element 50 is provided integrally with the correction optical system 45. The correction optical system 45 includes a first member 46 and a second member 47, and as a whole, has the same function as a prism having a power to deflect the imaging light L0. The first member 46 is provided on an incident surface (one surface) 51 of the first diffraction element 50. The second member 47 is provided on the opposite side of the first member 46 to the first diffraction element 50.

The first member 46 is a member that is transmissive and has an elastic modulus of 50 GPa or greater and 100 GPa or less. In the present exemplary embodiment, the first member 46 is formed by using a glass plate having an elastic modulus of 80 GPa, for example. The first diffraction element 50 is affixed to a back surface 46b of the first member 46. Note that a protective cover member formed from, for example, plastic, glass, or a hard coat, may be provided on a surface of the first diffraction element 50 facing the first member 46.

The second member 47 is affixed to a front surface 46a of the first member 46. An alignment mark for alignment with the second member 47 may be provided on the front surface 46a of the first member 46.

The second member 47 is a member that is transmissive and has optical power. The second member 47 is formed from a material having a refractive index substantially equal to that of the first member 46. For example, when the refractive index of the first member 46 is 1.5, the second member 47 is formed from a material having a refractive index of 1.3 to 1.9.

In the present exemplary embodiment, the second member 47 is formed from plastics such as acrylic resins, for example. The second member 47 has a back surface 47b that faces the first member 46 and a front surface 47a that faces away from the back surface 47b. Since the back surface 47b is constituted of a flat surface, a gap is not formed between the back surface 47b and the front surface 46a of the first member 46 constituted of a flat surface. An alignment mark for alignment with the first member 46 may be provided on the back surface 47b of the second member 47.

The front surface 47a is constituted of a surface having positive optical power. A surface having positive optical power refers to herein a lens shape such as a spherical surface, an aspheric surface, a cylindrical surface, or a free form surface. The front surface 47a of the second member 47 functions as a light incident/emission surface 45a of the correction optical system 45. Note that the front surface 47a may be an inclined surface that is inclined with respect to the back surface 47b. That is, the front surface 47a may be constituted of a flat surface as long as the front surface 47a has positive optical power.

As described above, in the present exemplary embodiment, the correction optical system 45 is formed by combining two pieces formed from glass and plastic, respectively.

Figure 5A:
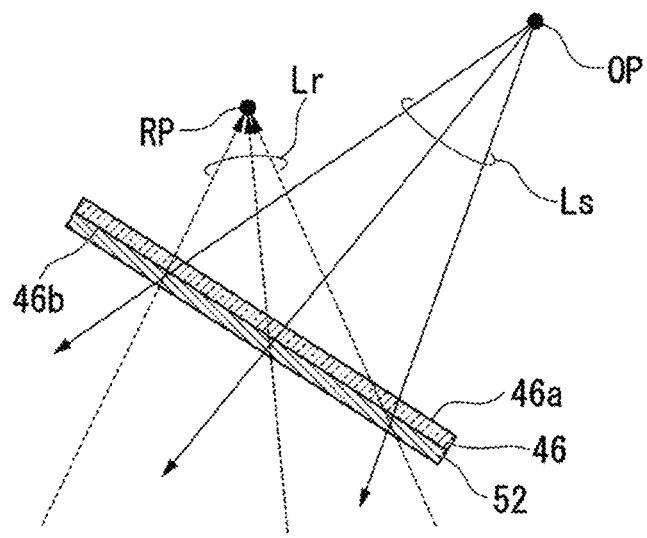
FIG. 5A is a diagram illustrating a production step of the second optical unit.
Figure 5B:
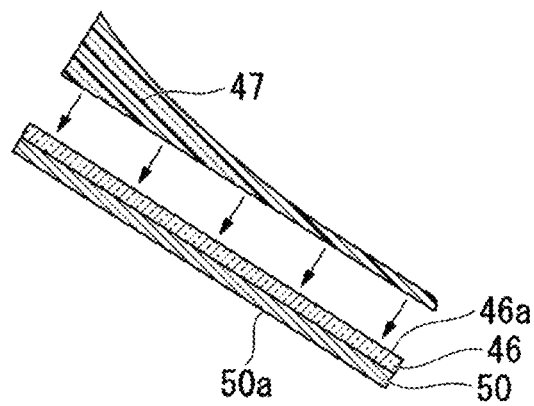
FIG. 5B is a diagram illustrating a production step of the second optical unit.

Next, a method of producing the second optical unit L20 will be described. FIGS. 5A and 5B are diagrams illustrating a production step of the second optical unit L20.

Similarly to the interference fringes 751 in the second diffraction element 70 illustrated in FIGS. 3A and 3B, the interference fringes 50a in the first diffraction element 50 can be formed by performing dual beam interference exposure of the holographic photosensitive layer by using reference light and object light.

First, as illustrated in FIG. 5A, the first member 46 that is transmissive and has an elastic modulus of 50 GPa or greater and 100 GPa or less is prepared, and a holographic photosensitive layer 52 is provided on the back surface 46b of the first member 46 by using application treatment, for example. In other words, the first member 46 is used as a supporting member during exposure of the holographic photosensitive layer 52. The holographic photosensitive layer 52 is formed from a hologram material in which a photosensitive monomer such as an acrylic polymer are dispersed in a binder resin such as an urethane resin, an epoxy resin, or a cellulose resin.

Then, dual beam interference exposure of the holographic photosensitive layer 52 is performed. In the dual beam interference exposure, to form the first diffraction element 50 as a hologram element, exposure is performed by causing the reference light Lr converging on a reference point RP to interfere, in the holographic photosensitive layer 52, with the object light Ls emitted from an object point OP.

During the interference exposure step, expansion or contraction of the holographic photosensitive layer 52 occurs. At this time, deformation such as warping may occur in the supporting member supporting the holographic photosensitive layer 52. If the supporting member deforms, the positions of the interference fringes are changed, and as a result, deterioration in diffraction performance, such as a change in diffraction angle, occurs.

According to the present exemplary embodiment, the first member 46 that supports the holographic photosensitive layer 52 has an elastic modulus of 50 GPa or greater and 100 GPa or less, and thus when expansion or contraction is about to occur during interference exposure, deformation of the holographic photosensitive layer 52 is suppressed by the first member 46. Thus, it is possible to prevent deterioration in diffraction performance due to expansion or contraction during the interference exposure step, and thus to provide a highly reliable first diffraction element 50.

In addition, in the producing method according to the present exemplary embodiment, it is possible to achieve an effect described below by performing dual beam interference exposure of the holographic photosensitive layer 52 supported on the first member 46 in which the light incident surface during the exposure is constituted of at least a flat surface.

Figure 6:
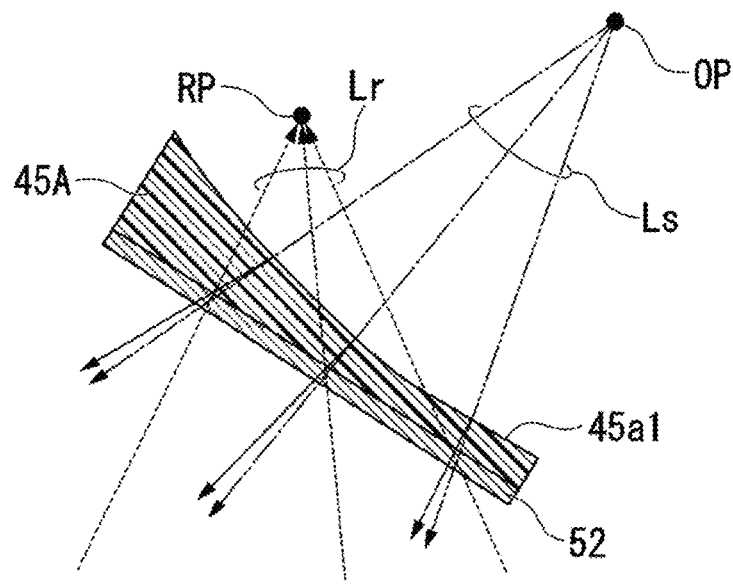
FIG. 6 is a diagram illustrating an exposure step in a comparative example.

Here, as a comparative example, a case in which a correction optical system formed by using a single member is used is considered. FIG. 6 is a diagram illustrating an exposure step in the comparative example. As illustrated in FIG. 6, when the holographic photosensitive layer 52 provided on the correction optical system 45A formed by a single component is subjected to the dual beam interference exposure, the object light Ls emitted from the object point OP is refracted by the light incident/emission surface 45a1 of the correction optical system 45A, and thus the wavefront significantly changes. On the other hand, since the reference light Lr that converges on the reference point RP is directly incident on the holographic photosensitive layer 52, wavefront change due to refraction at the surface of the correction optical system 45A does not occur.

As described above, in the exposure step of the comparative example, the wavefront of the object light Ls is greatly affected by the refraction at the light incident/emission surface 45a1. Thus, the holographic photosensitive layer 52 is exposed to a wavefront different from the original wavefront, as represented by a two-dot chain line in FIG. 6, and as a result, the desired diffraction performance as the first diffraction element 50 can not be achieved.

Note that, in FIG. 6, if the directions of rays of the exposure light are reversed, in other words, if light converging on the object point and light emitted from the reference point are used, the reference light is affected by the lens surface of the correction optical system 145. Thus, also in this case, the holographic photosensitive layer 52 is exposed to a wavefront that is different from the original wavefront.

On the other hand, in the exposure step in the present exemplary embodiment, as illustrated in FIG. 5A, the object light Ls emitted from the object point OP is incident on the front surface 46a of the first member 46. Since the front surface 46a located on the opposite side of the first member 46 to the first diffraction element 50 is constituted of a flat surface, the object light Ls is hardly affected by refraction at the front surface 46a, and thus wavefront change is reduced. In addition, a change in the wavefront of the reference light Lr directly incident on the holographic photosensitive layer 52 is small.

As described above, when the producing method according to the present exemplary embodiment is adopted, the wavefronts of the object light Ls and the reference light Lr are hardly affected by refraction, and thus the desired position in the holographic photosensitive layer 52 can be exposed to form the interference fringes 50a. Accordingly, the first diffraction element 50 having the desired diffraction performance can be produced.

Next, the second member 47 is provided on the opposite side, to the first member 46, of the first diffraction element 50 formed on the first member 46. Specifically, as illustrated in FIG. 5B, the back surface 47b of the second member 47 is affixed to the front surface 46a of the first member 46. In the affixing, the first member 46 and the second member 47 can be accurately affixed together by using, as a reference, the alignment marks (not illustrated) provided on the front surface 46a of the first member 46 and the back surface 47b of the second member 47.

As described above, the second optical unit L20 including the first diffraction element 50 and the correction optical system 45 can be produced. With the second optical unit L20 of the present exemplary embodiment, it is possible to reduce effects of refraction on the object light Ls and the reference light Lr during the interference exposure step, and to provide the first diffraction element 50 in which occurrence of expansion or contraction during the interference exposure step is suppressed. In other words, the first diffraction element 50 can achieve desired diffraction performance. Therefore, the second optical unit L20 including the first diffraction element 50 is highly reliable.

Figure 7:
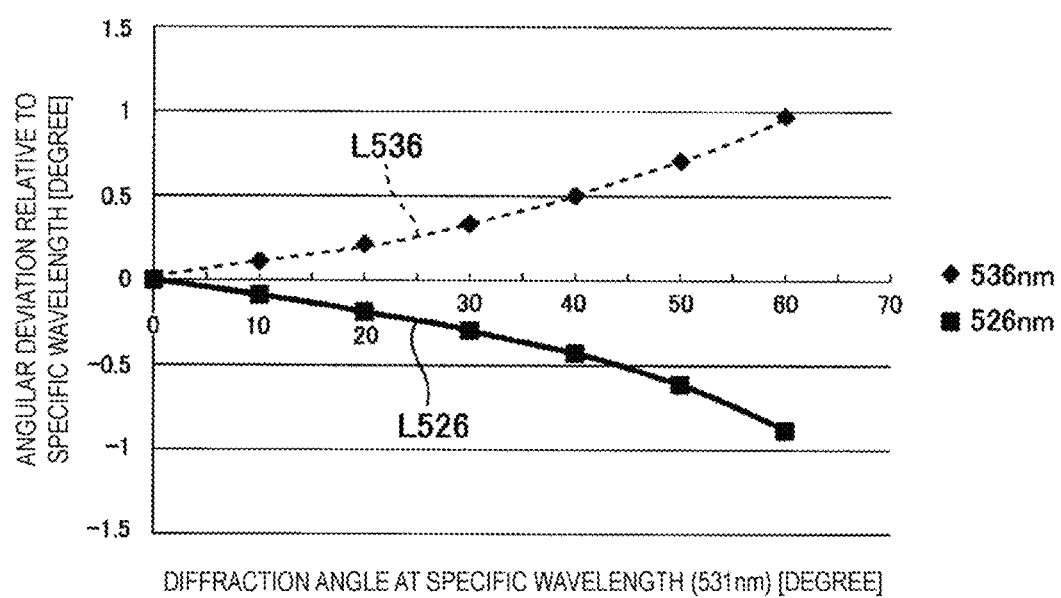
FIG. 7 is a schematic diagram of a diffraction characteristic in a volume hologram.

FIG. 7 is a diagram illustrating a diffraction characteristic in a volume hologram constituting the first diffraction element 50 and the second diffraction element 70. FIG. 7 illustrates a difference in diffraction angle between a specific wavelength and a peripheral wavelength when a light beam is incident on one point on the volume hologram. In FIG. 7, when the specific wavelength is 531 nm, a deviation in the diffraction angle of light with a peripheral wavelength of 526 nm is indicated by a solid line L526, and a deviation in the diffraction angle of light with a peripheral wavelength of 536 nm is indicated by a dotted line L536. As illustrated in FIG. 7, even when a light beam is incident on the same interference fringes recorded in the hologram, a light beam having a longer wavelength diffracts more greatly, and a light beam having a shorter wavelength is less likely to diffract. Thus, when two diffraction elements, namely, the first diffraction element 50 and the second diffraction element 70 are used as in the present exemplary embodiment, proper wavelength compensation fails to be achieved unless considerations are given for the ray angle of incident light with a wavelength larger or smaller than the specific wavelength. In other words, color aberration occurring in the second diffraction element 70 fails to be canceled.

In the optical system 10 illustrated in FIG. 2, as described in JP-A-2017-167181, wavelength compensation, namely, a color aberration cancellation can be achieved because an incident direction and the like to the second diffraction element 70 is made appropriate in accordance with whether a sum of the number of times of formation of an intermediate image between the first diffraction element 50 and the second diffraction element 70 and the number of times of reflection by the mirror 62 is odd or even.

Figure 8:
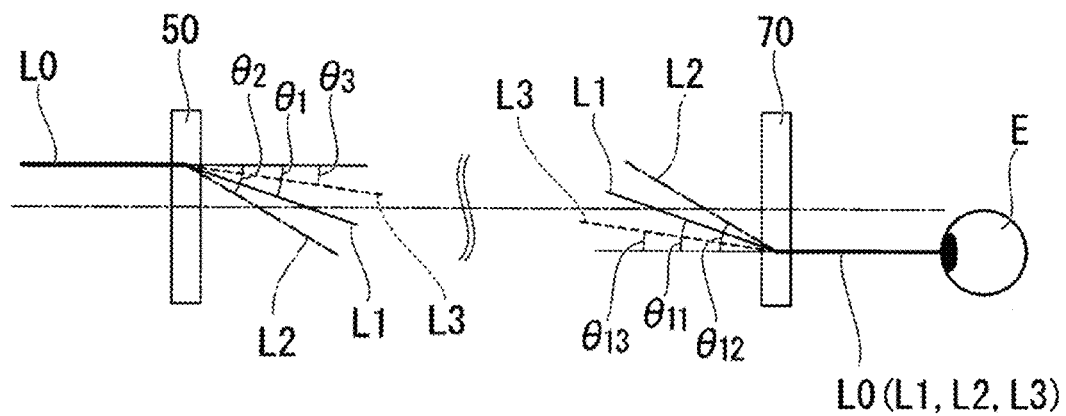
FIG. 8 is a schematic diagram of light emitted from a second diffraction element when diffraction angles are the same.

Here, a case in which diffraction angles of the first diffraction element 50 and the second diffraction element 70 are the same is considered. In other words, a case in which the diffraction angles of the first diffraction element 50 and the second diffraction element 70 are formed by the same diffraction element is considered. FIG. 8 is a schematic diagram of light emitted from the second diffraction element 70 when the diffraction angles of the first diffraction element 50 and the second diffraction element 70 are the same. FIG.

8 also illustrates, in addition to the light L1 (solid line) having the specific wavelength of the imaging light L0, the light L2 (dot-and-dash line) on the long wavelength side with respect to the specific wavelength and the light L3 (dotted line) on the short wavelength side with respect to the specific wavelength.

As illustrated in FIG. 8, the imaging light L0 incident on the first diffraction element 50 is diffracted and then deflected by the first diffraction element 50. At this time, in the first diffraction element 50 formed of the volume hologram as illustrated in FIG. 7, the light L2 on the long wavelength side with respect to the specific wavelength has a diffraction angle $\theta_2$ greater than a diffraction angle $\theta_1$ of the light L1 having the specific wavelength. Further, the light L3 on the short wavelength side with respect to the specific wavelength has a diffraction angle $\theta_3$ smaller than the diffraction angle $\theta_1$ of the light L1 having the specific wavelength. Therefore, the imaging light L0 emitted from the first diffraction element 50 is deflected and dispersed at each wavelength.

The imaging light L0 emitted from the first diffraction element 50 is incident on the second diffraction element 70 via the light-guiding system 60, and is then diffracted and deflected by the second diffraction element 70. At this time, on the optical path from the first diffraction element 50 to the second diffraction element 70, an intermediate image is formed once, and reflection by the mirror 62 is performed once. Therefore, when the incident angle is defined as an angle between the imaging light L0 and a normal line of an incident surface of the second diffraction element 70, the light L2 on the long wavelength side with respect to the specific wavelength has an incident angle $\theta_{12}$ larger than the incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. As described above, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a larger incident angle than the light L1 with the specific wavelength. However, the light L2 on the long wavelength side with respect to the specific wavelength has a larger diffraction angle than the light L1 with the specific wavelength, and as a result, the light L2 on the long wavelength side with respect to the specific wavelength and the light L1 with the specific wavelength are substantially parallel when being emitted from the second diffraction element 70. In contrast, the light L3 on the short wavelength side with respect to the specific wavelength is incident on the first diffraction element 50 at a smaller incident angle than the light L1 with the specific wavelength. However, the light L3 on the short wavelength side with respect to the specific wavelength has a smaller diffraction angle than the light L1 with the specific wavelength, and as a result, the light L3 on the short wavelength side with respect to the specific wavelength and the light L1 with the specific wavelength are substantially parallel when being emitted from the second diffraction element 70. In this way, as illustrated in FIG. 8, the imaging light L0 emitted from the second diffraction element 70 is incident as the substantially parallel light on the eye E of the observer. Thus, misalignment of image formation in the retina E0 at each wavelength can be suppressed, and a color aberration generated by the second diffraction element 70 can be canceled.

When the color aberration is canceled by setting the diffraction angles of the first diffraction element 50 and the second diffraction element 70 to be the same in this way, a conjugated relationship is established between the first diffraction element 50 and the second diffraction element 70. Here, the conjugated relationship refers to a relationship in which light emitted from a first position of the first diffraction element 50 is condensed by the light-guiding system 60 having positive power, and is incident on a second position corresponding to the first position of the second diffraction element 70.

However, when the conjugated relationship is established by setting the diffraction angles of the first diffraction element 50 and the second diffraction element 70 to be the same as described above, the following problem arises.

Figure 9A:
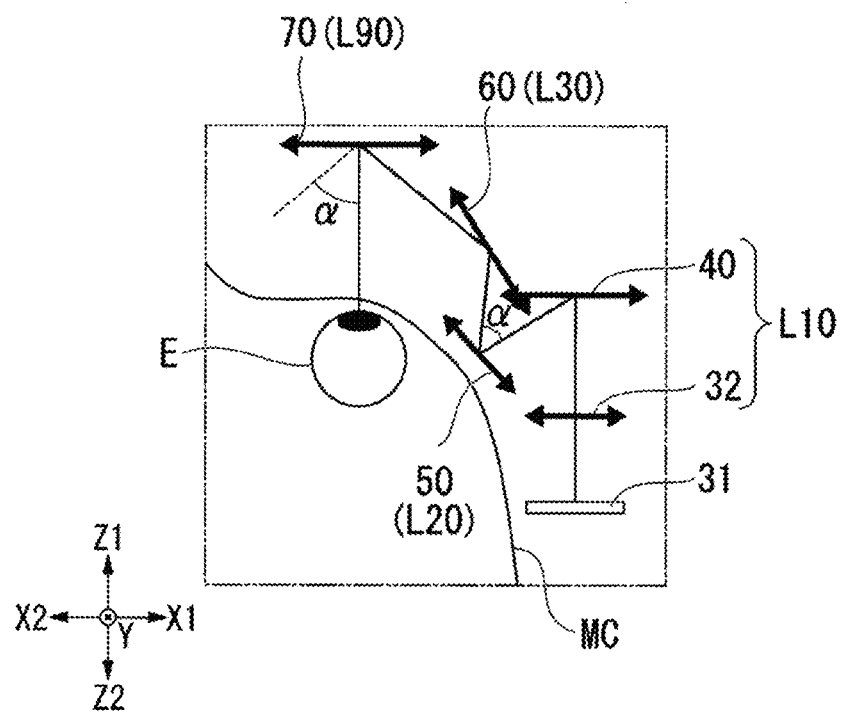
FIG. 9A is a schematic diagram when diffraction angles of a first diffraction element and the second diffraction element are set to a small angle.
Figure 9B:
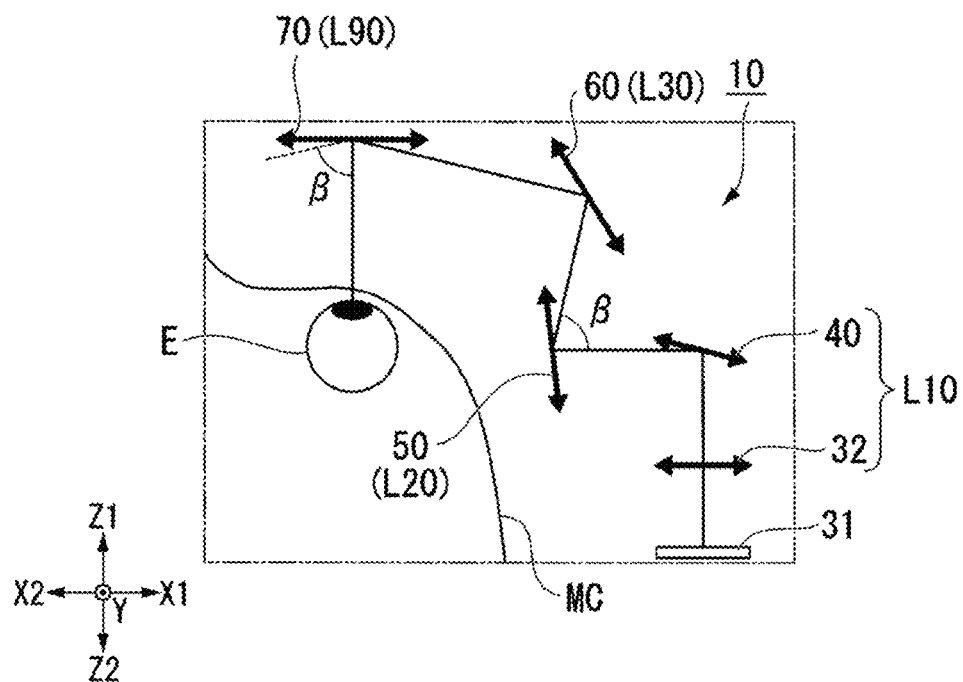
FIG. 9B is a schematic diagram when the diffraction angles of the first and second diffraction elements are set to a large angle.

FIG. 9A is a schematic diagram when the diffraction angles of the first diffraction element 50 and the second diffraction element 70 are set to a small angle. FIG. 9B is a schematic diagram when the diffraction angles of the first diffraction element 50 and the second diffraction element 70 are set to a large angle. Note that, in FIGS. 9A and 9B, each optical unit disposed along an optical axis is simplified and indicated by a thick arrow.

In FIG. 9A, the diffraction angles of the first diffraction element 50 and the second diffraction element 70 are set to a small angle $\alpha$. In FIG. 9B, the diffraction angles of the first diffraction element 50 and the second diffraction element 70 are set to an angle $\beta$ greater than the angle $\alpha$.

As illustrated in FIG. 9A, when the diffraction angles of the first diffraction element 50 and the second diffraction element 70 are set to the small angle $\alpha$, it is possible to reduce the size of the display device by disposing each optical member along a contour MC of a face of the observer. However, as illustrated in FIG. 9A, there is a problem in that the mirror 40 and the light-guiding system 60 interfere with each other and a part of the imaging light is missing.

On the other hand, as illustrated in FIG. 9B, when the diffraction angles of the first diffraction element 50 and the second diffraction element 70 are set to the large angle $\beta$, it is possible to avoid interference between the mirror 40 and the light-guiding system 60 by widening a gap therebetween. However, each optical member is disposed in a position away from the contour MC of the face of the observer, which results in a problem of increasing the size of the display device.

Figure 10:
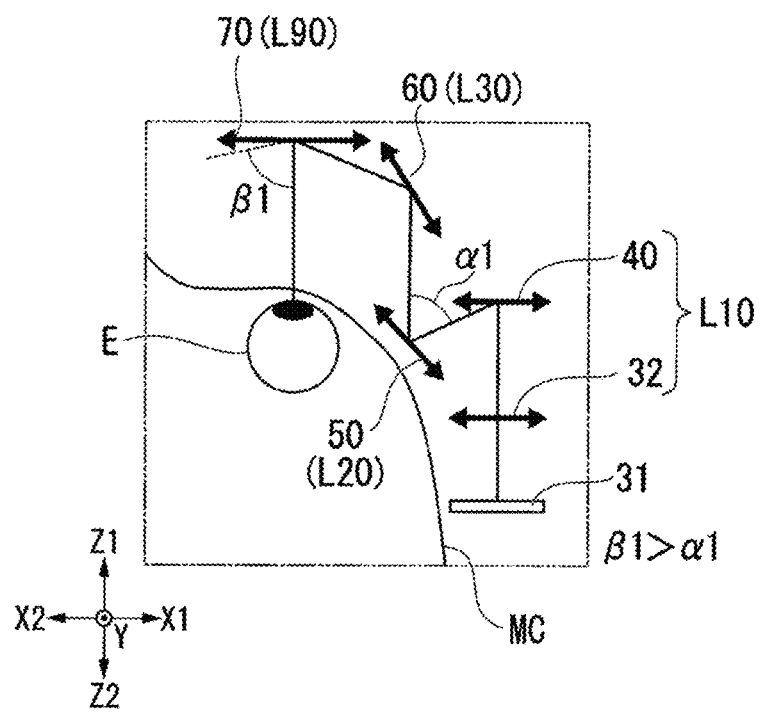
FIG. 10 is a diagram illustrating a relationship between the diffraction angles of the first diffraction element and the second diffraction element.

Thus, in the optical system 10 in the present exemplary embodiment, the first diffraction element 50 and the second diffraction element 70 have different diffraction angles. FIG. 10 is a diagram illustrating a relationship between the diffraction angles of the first diffraction element 50 and the second diffraction element 70 in the optical system 10 in the present exemplary embodiment.

As illustrated in FIG. 10, in the optical system 10 in the present exemplary embodiment, a first diffraction angle α1 of the imaging light L0 in the first diffraction element 50 and a second diffraction angle β1 of the imaging light L0 in the second diffraction element 70 are different. Specifically, the second diffraction angle β1 is greater than the first diffraction angle α1. According to the optical system 10 in the present exemplary embodiment, by setting the second diffraction angle β1 to be greater than the first diffraction angle α1, the imaging light L0 is incident on the eye E of the observer at a large angle of view, and each optical unit can also be disposed along the contour MC of the face of the observer. Therefore, the size reduction of the display device itself including the optical system 10 can be achieved.

Thus, as described above, the size reduction of the display device can be achieved by setting the diffraction angles α1 and β1 of the first diffraction element 50 and the second diffraction element 70 to be different from each other, but a new problem arises as described below.

Figure 11:
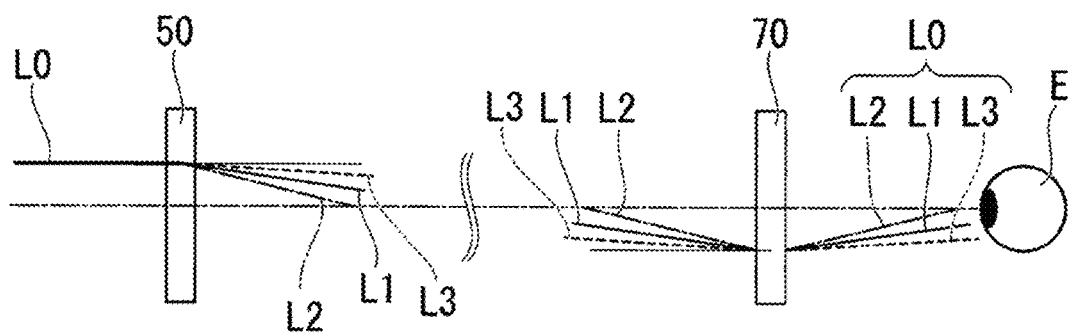
FIG. 11 is a schematic diagram of light emitted from the second diffraction element when the diffraction angles are different.

FIG. 11 is a schematic diagram of light emitted from the second diffraction element 70 when the diffraction angles of the first diffraction element 50 and the second diffraction element 70 are different. Note that it is assumed that the correction optical system 45 is not disposed on the optical path illustrated in FIG. 11. FIG. 11 illustrates light L1 (solid line) of a specific wavelength of the imaging light L0 as well as light L2 (dot-and-dash line) on a long wavelength side and light L3 (dotted line) on a short wavelength side relative to the specific wavelength.

As illustrated in FIG. 11, the imaging light L0 incident on the first diffraction element 50 is diffracted and then deflected by the first diffraction element 50. At this time, as illustrated in FIG. 11, the imaging light L0 emitted from the first diffraction element 50 is deflected and dispersed at each wavelength.

The imaging light L0 emitted from the first diffraction element 50 is diffracted and then deflected by the second diffraction element 70. At this time, since the diffraction angle of the second diffraction element 70 is different from the diffraction angle of the first diffraction element 50, the light L2 on the long wavelength side and the light L3 on the short wavelength side with respect to the light L1 having the specific wavelength are emitted in a widened state, as illustrated in FIG. 11. In this way, as illustrated in FIG. 11, the imaging light L0 emitted from the second diffraction element 70 is shifted in an image formation position in the retina E0 at each wavelength, and thus there is a problem in that a color aberration cannot be canceled, and a resolution of the imaging light L0 is reduced.

To resolve this problem, as illustrated in FIG. 2, the optical system 10 in the present exemplary embodiment includes, between the first optical unit L10 and the fourth optical unit L40 on the optical path of the imaging light L0, the correction optical system 45 that corrects an incident angle of the imaging light L0 with respect to the second diffraction element 70. More specifically, the correction optical system 45 is integrally provided on a light incident side and a light emitting side of the first diffraction element 50 constituting the second optical unit L20. The correction optical system 45 includes the light incident/emission surface 45a on which the imaging light L0 is incident or from which the imaging light L0 is emitted.

The correction optical system 45 has a shape in which a thickness on the side closer to the eye E of the observer is thick and a thickness on the side away from the eye E of the observer is thin. Further, it can also be said that the correction optical system 45 has a shape in which a thickness on the side closer to the second diffraction element 70 located on the left side X2 with respect to the first diffraction element 50 is thick, and a thickness on the side closer to the imaging light generating device 31 located on the right side X1 with respect to the first diffraction element 50 is thin.

The light incident/emission surface 45a is constituted of a surface being inclined so as to protrude toward the front side Z1 as it is closer to the eye E of the observer. Further, it can also be said that the light incident/emission surface 45a is constituted of a surface being inclined so as to protrude toward the front side Z1 as it is closer to the second diffraction element 70.

Next, functions of the correction optical system 45 will be described with reference to drawings.

Figure 12A:
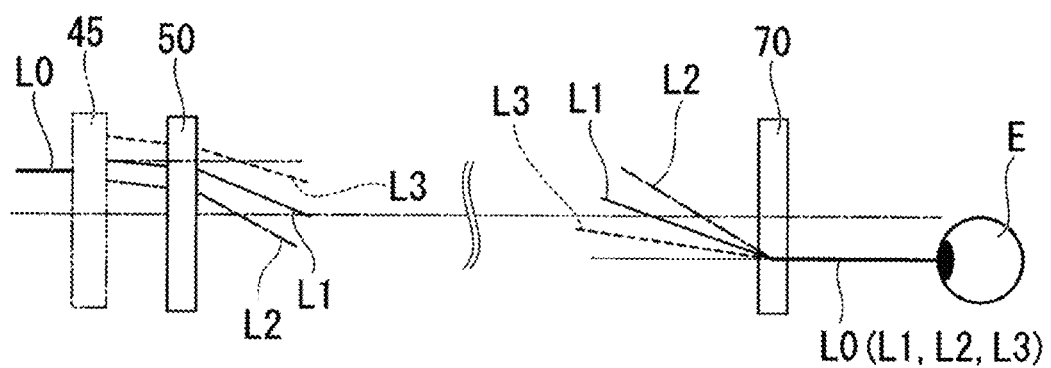
FIG. 12A is a diagram illustrating a first effect of a correction optical system.
Figure 12B:
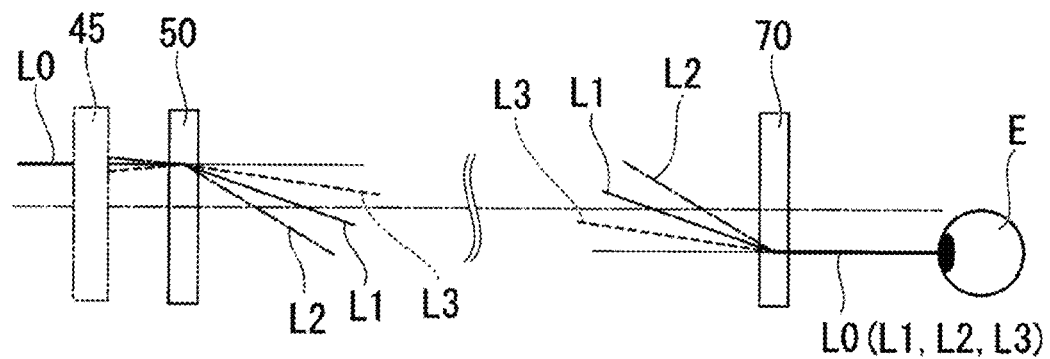
FIG. 12B is a diagram illustrating a second effect of the correction optical system.
Figure 12C:
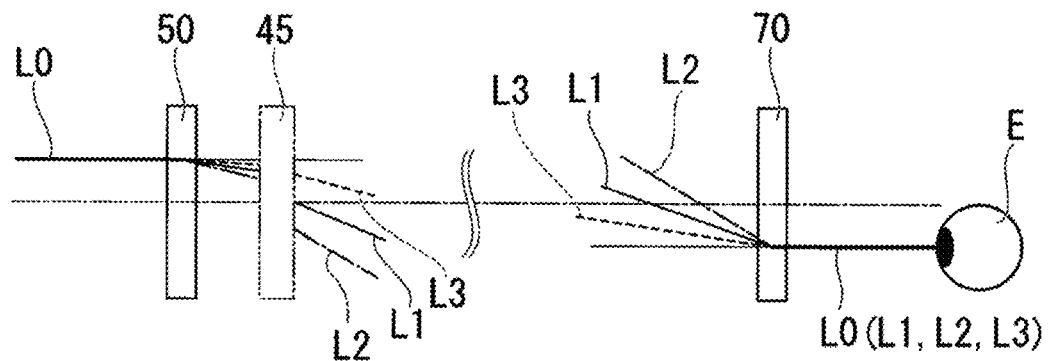
FIG. 12C is a diagram illustrating a third effect of the correction optical system.

FIG. 12A is a diagram illustrating a first function of the correction optical system 45, FIG. 12B is a diagram illustrating a second function of the correction optical system 45, and FIG. 12C is a diagram illustrating a third function of the correction optical system 45. Note that it is assumed in FIGS. 12A, 12B, and 12C that the second diffraction angle β1 of the second diffraction element 70 is greater than the first diffraction angle α1 of the first diffraction element 50.

Figure 13:
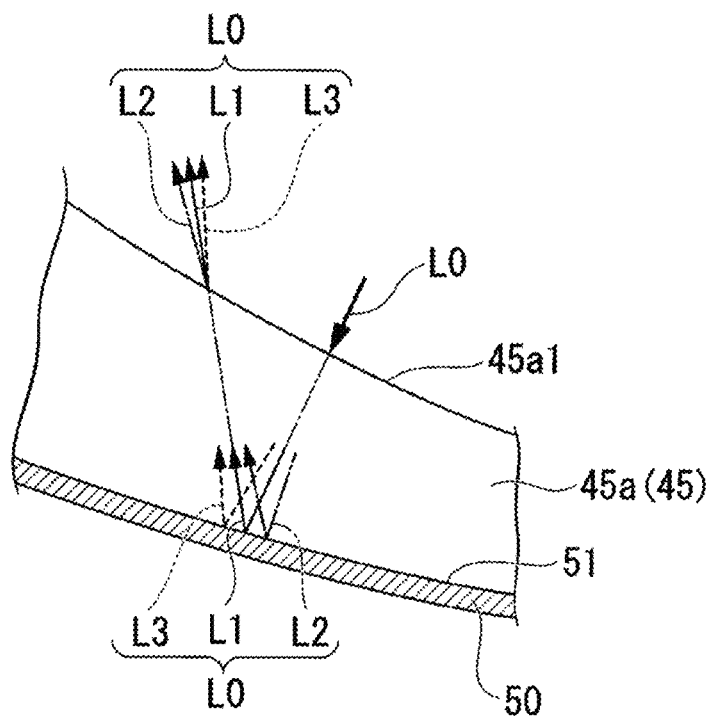
FIG. 13 is an enlarged view of a prism.

FIG. 13 is an enlarged view of the correction optical system 45. The first member 46 and the second member 47 are omitted in FIG. 13. FIG. 13 also illustrates, in addition to the light L1 (solid line) having the specific wavelength of the imaging light L0, the light L2 (dot-and-dash line) on the long wavelength side with respect to the specific wavelength and the light L3 (dotted line) on the short wavelength side with respect to the specific wavelength.

As illustrated in FIG. 12A, the correction optical system 45 is provided on a light incident side of the first diffraction element 50 on the optical path of the imaging light L0. Thus, as illustrated in FIG. 13, the imaging light L0 enters the correction optical system 45 through the light incident/emission surface 45a. At this time, when the imaging light L0 is incident on the correction optical system 45, due to dispersion of the light, the light L3 on the short wavelength side is refracted the most, the light L2 on the long wavelength side is the smallest, and the light L1 having the specific wavelength is refracted by the magnitude between the light L3 on the short wavelength side and the light L2 on the long wavelength side. Then, the light L1 having the specific wavelength, the light L2 on the long wavelength side, and the light L3 on the short wavelength side are transmitted through the correction optical system 45 and are incident on the first diffraction element 50.

The light L1 having the specific wavelength, the light L2 on the long wavelength side, and the light L3 on the short wavelength side are dispersed by the correction optical system 45 and are thus incident on different places of the first diffraction element 50. Further, incident angles of the light L1 having the specific wavelength, the light L2 on the long wavelength side, and the light L3 on the short wavelength side with respect to the first diffraction element 50 are different from each other.

As described above, by dispersing the imaging light L0, the correction optical system 45 changes an incident position and incident angle with respect to the first diffraction element 50, differently for each of the light L1 having the specific wavelength, the light L2 on the long wavelength side, and the light L3 on the short wavelength side.

Here, a diffraction angle of the volume hologram constituting the first diffraction element 50 varies from place to place. The correction optical system 45 corrects, for example, an incident position of each of the light L1 having the specific wavelength in the imaging light L0, the light L2 on the long wavelength side, and the light L3 on the short wavelength side with respect to the first diffraction element 50 to an appropriate position. In this way, the correction optical system 45 can correct an incident angle of the imaging light L0 emitted from the first diffraction element 50 with respect to the second diffraction element 70 such that the light having the specific wavelength and the light having the peripheral wavelength are substantially parallel as illustrated in FIG. 8 when being emitted from the second diffraction element 70. In other words, the correction optical system 45 has a first function that is "performing correction so as to change an incident position of the imaging light L0 incident on the first diffraction element 50 for each wavelength" as illustrated in FIG. 12A.

Furthermore, as illustrated in FIG. 12B, the correction optical system 45 corrects an incident angle of the imaging light L0 with respect to the first diffraction element 50 at each wavelength, namely, for each of the light L1 having the specific wavelength, the light L2 on the long wavelength side, and the light L3 on the short wavelength side. As a result, the incident angle of the imaging light L0 with respect to the first diffraction element 50 is corrected by, for example, previously angling the light L2 on the long wavelength side and the light L3 on the short wavelength side in the imaging light L0, as illustrated in FIG. 13. In this way, the correction optical system 45 can cause the imaging light L0 to be incident on the first diffraction element 50 such that the light having the specific wavelength and the light having the peripheral wavelength are substantially parallel as illustrated in FIG. 8 when being emitted from the second diffraction element 70. In other words, the correction optical system 45 has a second function, that is "correcting an incident angle of the imaging light L0 with respect to the first diffraction element 50 for each wavelength", as illustrated in FIG. 12B.

As illustrated in FIG. 12C, the correction optical system 45 is provided between the first diffraction element 50 and the second diffraction element 70 on the optical path of the imaging light L0. Thus, the imaging light L0 emitted from the first diffraction element 50 is incident on the correction optical system 45 in a dispersed state at each wavelength.

As illustrated in FIG. 13, since a diffraction angle at the first diffraction element 50 varies depending on a place, the light L1 having the specific wavelength, the light L2 on the long wavelength side, and the light L3 on the short wavelength side are diffracted at different angles. The light L1 having the specific wavelength, the light L2 on the long wavelength side, and the light L3 on the short wavelength side that are diffracted by the first diffraction element 50 are transmitted through the correction optical system 45 again and emitted from the light incident/emission surface 45a. The light L1 having the specific wavelength, the light L2 on the long wavelength side, and the light L3 on the short wavelength side are emitted from the correction optical system 45 in different directions. In this way, the correction optical system 45 deflects the imaging light L0 in a different direction for each wavelength, and thus incident angles of the light L1 having the specific wavelength, the light L2 on the long wavelength side, and the light L3 on the short wavelength side with respect to the second diffraction element 70 can be each adjusted.

In other words, the correction optical system 45 compensates for a shortage of the diffraction angle of the imaging light L0 in the first diffraction element 50, and thereby an incident angle of the imaging light L0 dispersed at each wavelength with respect to the second diffraction element 70 is corrected. In this way, the correction optical system 45 can correct an emission angle of the imaging light L0 dispersed at each wavelength such that the light having the specific wavelength and the light having the peripheral wavelength are substantially parallel as illustrated in FIG. 8 when being emitted from the second diffraction element 70. In other words, the correction optical system 45 has a third function that is "performing correction so as to compensate for a shortage of a diffraction angle of the imaging light L0 at the first diffraction element 50", as illustrated in FIG. 12C.

As described above, the correction optical system 45 can achieve effects illustrated in FIGS. 12A, 12B, and 12C, and thus the imaging light L0 emitted from the second diffraction element 70 can be incident on the eye E of the observer as substantially parallel light. Thus, misalignment of image formation in the retina E0 at each wavelength can be suppressed, and a color aberration generated by the second diffraction element 70 can be canceled. Therefore, by including the second optical unit L20 that includes the correction optical system 45, high image quality can be acquired by canceling a color aberration generated by the second diffraction element 70 while adopting a structure in which the diffraction angles of the first diffraction element 50 and the second diffraction element 70 are different. In other words, the size reduction of the display device 100 can be achieved by setting diffraction angles to be different while appropriately performing wavelength compensation by the two diffraction elements.

As described above, the optical system 10 including the correction optical system 45 in the present exemplary embodiment can provide functions illustrated in FIGS. 12A, 12B, and 12C. Thus, the optical system 10 in the present exemplary embodiment can accurately correct an incident angle of the imaging light L0 with respect to the second diffraction element 70 by using the correction optical system 45.

Therefore, even when the first diffraction element 50 and the second diffraction element 70 having different diffraction angles are used, the optical system 10 in the present exemplary embodiment can cause the imaging light L0 emitted from the second diffraction element 70 to be incident on the eye E of the observer as substantially parallel light by the correction optical system 45. Thus, misalignment of image formation in the retina E0 at each wavelength can be suppressed, and a color aberration generated by the second diffraction element 70 can be canceled. As a result, deterioration in resolution of imaging light can be prevented.

In other words, the optical system 10 in the present exemplary embodiment can acquire high image quality by canceling a color aberration generated by the second diffraction element 70 while adopting a structure in which the diffraction angles of the first diffraction element 50 and the second diffraction element 70 are different. In other words, the optical system 10 in the present exemplary embodiment can achieve the size reduction of the display device 100 by setting different diffraction angles while appropriately performing wavelength compensation by the two diffraction elements.

Figure 14:
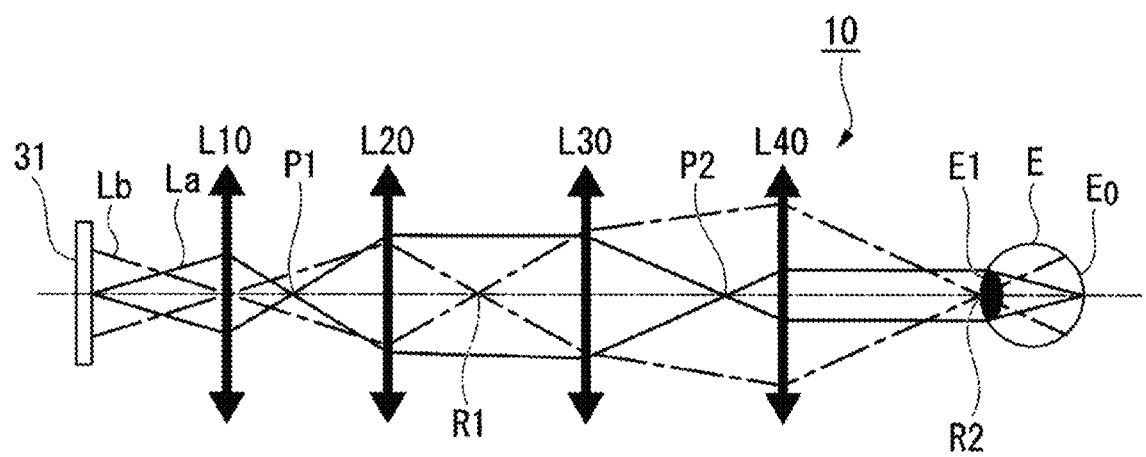
FIG. 14 is a diagram schematically illustrating a light beam diagram of an optical system.

FIG. 14 is a diagram schematically illustrating a light beam diagram of the optical system 10 in the present exemplary embodiment. In FIG. 14, each optical unit disposed along the optical axis is indicated by a thick arrow. Further, in FIG. 14, a light beam of the imaging light emitted from the center of the imaging light generating device 31 is indicated by a solid line La, and a main light beam of the imaging light emitted from an end portion of the imaging light generating device 31 is indicated by a dot-and-dash line Lb. Further, FIG. 14 illustrates travel of light emitted from the imaging light generating device 31. Note that, in FIG. 14, all optical units are illustrated as a transmissive-type unit for simplification of the figure. In the following description, an "intermediate image" is a location where the light beam (solid line La) emitted from one pixel converges, and a "pupil" is a location where the main light beam (dot-and-dash line Lb) at each angle of view converges.

As illustrated in FIG. 14, the optical system 10 of the present exemplary embodiment includes the first optical unit L10 having positive power, the second optical unit L20 including the first diffraction element 50 and having positive power, the third optical unit L30 having positive power, and the fourth optical unit L40 including the second diffraction element 70 and having positive power, and the first to fourth optical units L10 to L40 are provided along an optical path of imaging light emitted from the imaging light generating device 31.

In the optical system 10 in the present exemplary embodiment, a first intermediate image P1 of the imaging light is formed between the first optical unit L10 and the third optical unit L30, a pupil R1 is formed between the second optical unit L20 and the fourth optical unit L40, a second intermediate image P2 of the imaging light is formed between the third optical unit L30 and the fourth optical unit L40, and the fourth optical unit L40 collimates the imaging light to form an exit pupil R2. At this time, the third optical unit L30 causes the main light beam at the angle of view of the imaging light emitted from the second optical unit L20 to be incident on the fourth optical unit L40 as divergent light.

In the optical system 10 in the present exemplary embodiment, the pupil R1 is formed between the second optical unit L20 and the third optical unit L30 between the second optical unit L2 and the fourth optical unit L40.

Thus, according to the optical system 10 of the present exemplary embodiment, the first intermediate image P1 of the imaging light is formed between the projection optical system 32 and the light-guiding system 60, the pupil R1 is formed in the vicinity of the light-guiding system 60, the second intermediate image P2 of the imaging light is formed between the light-guiding system 60 and the second diffraction element 70, and the second diffraction element 70 collimates the imaging light to form the exit pupil R2.

In the optical system 10 in the present exemplary embodiment, the first intermediate image P1 is formed between the first optical unit L10 (projection optical system 32) and the second optical unit L20 (first diffraction element 50).

According to the optical system 10 in the present exemplary embodiment, three conditions (Conditions 1, 2, and 3) described below are satisfied.

Condition 1: The light rays emitted from one point of the imaging light generating device 31 are formed into one point on the retina E0.

Condition 2: An incident pupil of the optical system and a pupil of an eye are conjugated.

Condition 3: A peripheral wavelength is compensated between the first diffraction element 50 and the second diffraction element 70.

More specifically, as clearly seen from the dot-and-dash line Lb illustrated in FIG. 14, the light beam emitted from one point of the imaging light generating device 31 satisfies Condition 1 that an image is formed as one point in the retina E0, and thus the observer can visually recognize one pixel. Further, as clearly seen from the solid line La illustrated in FIG. 14, Condition 2 that the incident pupil of the optical system 10 and the pupil E1 of the eye E are conjugated (conjugation of the pupil) is satisfied, and thus the entire region of the image generated by the imaging light generating device 31 can be visually recognized. Further, as described above, Condition 3 that the peripheral wavelength of the imaging light L0 is compensated between the first diffraction element 50 and the second diffraction element 70 is satisfied by providing the correction optical system 45, and thus a color aberration generated by the second diffraction element 70 can be canceled.

Second Exemplary Embodiment

Next, an optical system according to a second exemplary embodiment will be described. In the optical system in the above-described exemplary embodiment, the front surface of the first member in the correction optical system is constituted of a flat surface. However, the plate shape of the first member is not limited thereto. Note that components common to the first exemplary embodiment will be given an identical reference numeral and detail description will be omitted.

Figure 15:
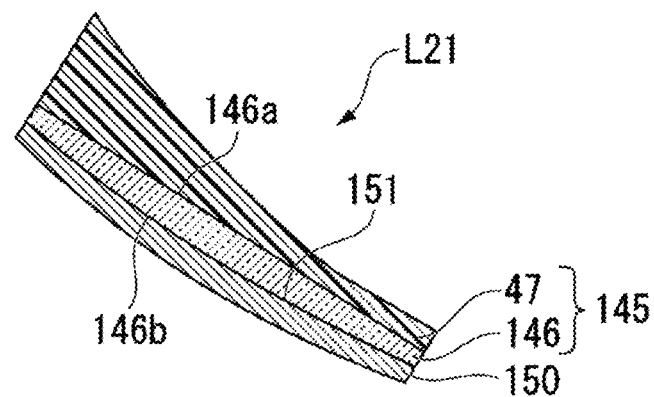
FIG. 15 is a cross-sectional view illustrating a general configuration of a second optical unit in a second exemplary embodiment.

FIG. 15 is a cross-sectional view illustrating a general configuration of the second optical unit in the present exemplary embodiment. As illustrated in FIG. 15, a second optical unit L21 in the present exemplary embodiment includes a first diffraction element 150 and a correction optical system 145. The correction optical system 145 includes a first member 146 and the second member 47. The first member 146 is provided on an incident surface (one surface) 151 of the first diffraction element 150. The second member 47 is provided on the opposite side of the first member 146 to the first diffraction element 50.

The first member 146 is a member that is transmissive and has an elastic modulus of 50 GPa or greater and 100 GPa or less. In the present exemplary embodiment, the first member 146 is formed from glass having an elastic modulus of 80 GPa, for example. The first diffraction element 150 is affixed to a back surface 146b of the first member 146. The back surface 146b of the first member 146 is constituted of a curved surface, and the front surface 146a is constituted of a flat surface. The second member 47 is affixed to the front surface 146a constituted of a flat surface.

In the present exemplary embodiment, the first diffraction element 150 is provided on the back surface 146b of the first member 146 constituted of a curved surface. Thus, the incident surface 151 of the first diffraction element 150 on which the imaging light L0 is incident is concaved to form a concave surface. In other words, the incident surface 151 of the first diffraction element 150 has a shape having a central portion recessed and curved with respect to a peripheral portion in the incident direction of the imaging light L0. Thus, the first diffraction element 150 can efficiently deflect the imaging light L0 toward the light-guiding system 60.

With the second optical unit L21 in the present exemplary embodiment, similar effects to the above-described exemplary embodiment can be achieved. In other words, it is possible to reduce effects of refraction on the object light and the reference light during interference exposure, and to suppress occurrence of expansion and contraction, and thus, to provide the first diffraction element 150 having a desired diffraction performance.

Third Exemplary Embodiment

Next, an optical system according to a third exemplary embodiment will be described. In the optical systems in the above-described exemplary embodiments, the first member and the second member in the correction optical system are in close contact with each other. However, in a correction optical system in the present exemplary embodiment, a configuration in which, in the correction optical system of the second embodiment, the first member and the second member are spaced apart from each other is described. Note that components common to the second exemplary embodiment will be given an identical reference numeral and detail description will be omitted.

Figure 16:
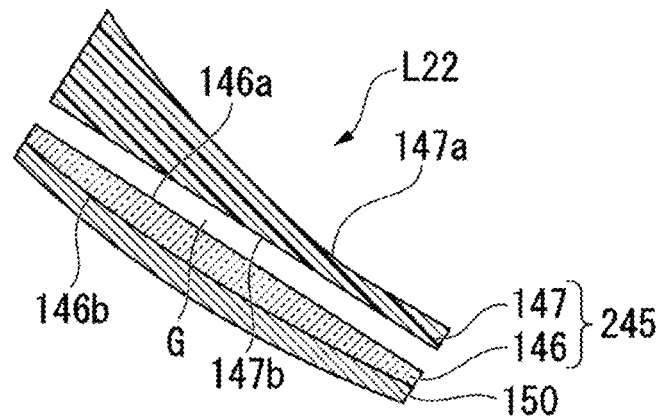
FIG. 16 is a cross-sectional view illustrating a general configuration of a second optical unit in a third exemplary embodiment.

FIG. 16 is a cross-sectional view illustrating a general configuration of the second optical unit in the present exemplary embodiment. As illustrated in FIG. 16, a second optical unit L22 includes the first diffraction element 150 and a correction optical system 245. The correction optical system 245 includes the first member 146 and a second member 147 that are spaced apart from each other.

In the present exemplary embodiment, the first member 146 is provided on the incident surface 151 of the first diffraction element 150. The second member 147 is provided on the opposite side of the first member 146 to the first diffraction element 150 so as to be spaced from the first member 146. In other words, a gap G is provided between the front surface 146a of the first member 146 and the back surface 147b of the second member 147. Note that the second member 147 is fixed to a holding member such as a lens barrel (not illustrated) so as to be spaced from the first member 146.

With the correction optical system 245 in the present exemplary embodiment, effects similar to those in the above-mentioned exemplary embodiments can also be achieved.

Note that an anti-reflective coating such as a AR coat may be provided on at least one of the front surface 146a of the first member 146 and the back surface 147b of the second member 147.

Figure 17:
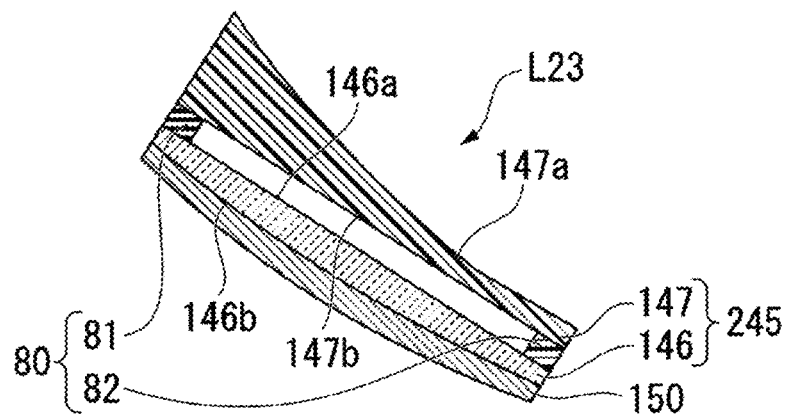
FIG. 17 is a cross-sectional view illustrating a configuration according to a modification example of the third exemplary embodiment.

FIG. 17 is a cross-sectional view illustrating a configuration according to a modification example of the third exemplary embodiment.

As illustrated in FIG. 17, in a second optical unit L23 of the present modification example, a spacer member 80 is disposed between the front surface 146a of the first member 146 and the back surface 147b of the second member 147. The spacer member 80 holds the gap G between the first member 146 and the second member 147 so as to be a predetermined value. The spacer member 80 includes a first spacer portion 81 and a second spacer portion 82. The first spacer portion 81 is provided at a part of a space between the front surface 146a of the first member 146 and the back surface 147b of the second member 147, and the second spacer portion 82 is provided at a part of the remainder of the space between the front surface 146a of the first member 146 and the back surface 147b of the second member 147. Each of the first spacer portion 81 and the second spacer portion 82 is formed from a different material. For example, one of the first spacer portion 81 and the second spacer portion 82 is formed from a plastic material, and the other of the first spacer portion 81 and the second spacer portion 82 is formed from an elastic member such as rubber.

Since the first member 146 formed from glass and the second member 147 formed from plastic are different in linear expansion coefficient, and thus also different in strain when heated. With the configuration of the present exemplary embodiment, the second spacer portion 82 formed from the elastic member can expand or contract, and thus the effect of thermal strain due to the difference in linear expansion coefficient can be mitigated. As a result, breakage of the correction optical system 245 due to thermal strain can be prevented.

With the configuration according to the modification example, effects similar to those in the above-mentioned exemplary embodiments can also be achieved.

Note that the spacer member may be provided integrally with the back surface 147b of the second member 147. In this case, the number of parts can be reduced by integrally forming the second member 147 and the spacer member.

Note that the correction optical system 45 in the first exemplary embodiment may have a configuration in which the first member 46 and the second member 47 are spaced from each other. In other words, the gap G may be provided between the first member 46 and the second member 47.

Fourth Exemplary Embodiment

Next, an optical system according to a fourth exemplary embodiment will be described. In the optical systems in the above-described exemplary embodiments, the front surface of the first member in the correction optical system is constituted of a flat surface. However, the front surface of the first member may be a curved surface. In the correction optical system in the present exemplary embodiment, a case in which the front surface of the first member is a curved surface is described. Note that components common to the first exemplary embodiment will be given an identical reference numeral and detail description will be omitted.

Figure 18:
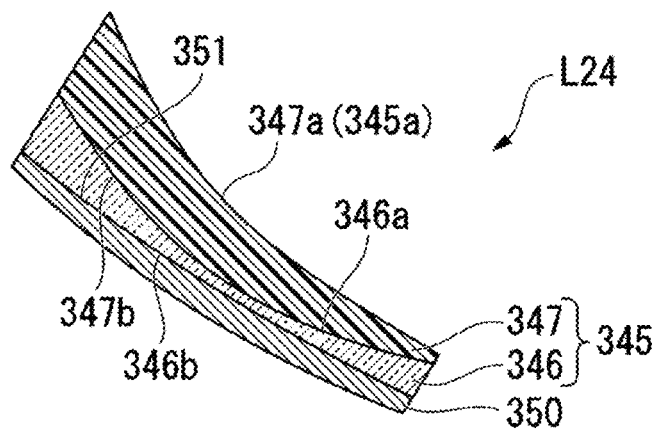
FIG. 18 is a cross-sectional view illustrating a general configuration of a second optical unit in a fourth exemplary embodiment.

FIG. 18 is a cross-sectional view illustrating a general configuration of the second optical unit in the present exemplary embodiment. As illustrated in FIG. 18, a second optical unit L24 includes a first diffraction element 350 and a correction optical system 345. The correction optical system 345 includes a first member 346 and a second member 347. The first member 346 is provided on an incident surface (one surface) 351 of the first diffraction element 350. The second member 347 is provided on the opposite side of the first member 346 to the first diffraction element 350.

The first member 346 is a member that is transmissive and has an elastic modulus of 50 GPa or greater and 100 GPa or less. In the present exemplary embodiment, the first member 346 is formed from glass having an elastic modulus of 80 GPa, for example. The first diffraction element 350 is affixed to a back surface 346b of the first member 346. Both the back surface 346b and a front surface 346a of the first member 346 are constituted of a curved surface. The second member 347 is affixed to the front surface 346a.

The second member 347 is a member that is transmissive and has optical power. In the present exemplary embodiment, the second member 347 is formed from plastics such as acrylic resins, for example. The second member 347 has a back surface 347b that faces the first member 346 and a front surface 347a that faces away from the back surface 347b. The front surface 347a is constituted of a surface having positive optical power, and functions as the light incident/emission surface 345a of the correction optical system 345.

Figure 19:
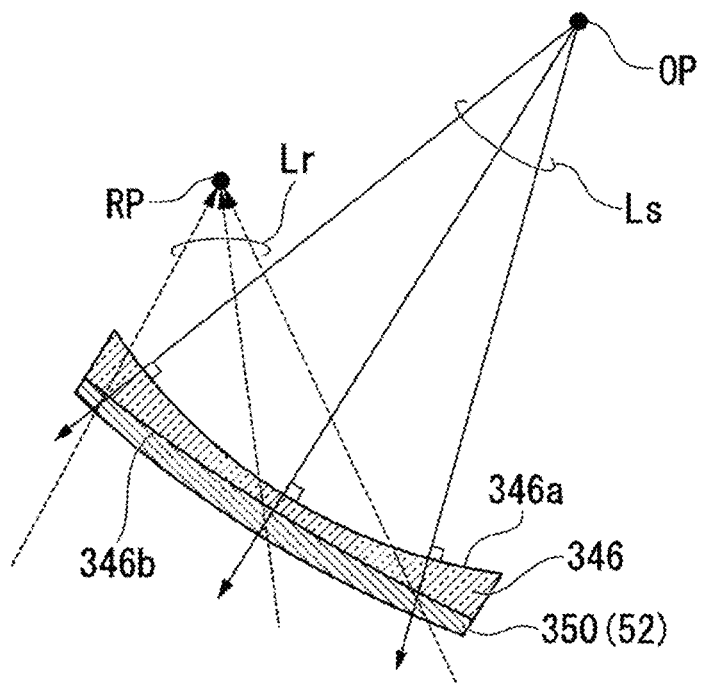
FIG. 19 is a diagram illustrating an exposure step of the first diffraction element.

A method of producing the second optical unit in the present exemplary embodiment will now be described. FIG. 19 is a diagram illustrating the exposure step of the first diffraction element 350.

As illustrated in FIG. 19, the first member 346 is prepared, and the holographic photosensitive layer 52 is provided on the back surface 346b of the first member 346 by using application treatment, for example. Next, dual beam interference exposure of the holographic photosensitive layer 52 is performed. In the dual beam interference exposure, to form the first diffraction element 350 as a hologram element, exposure is performed by causing the reference light Lr converging on a reference point RP to interfere, in the holographic photosensitive layer 52, with the object light Ls emitted from an object point OP.

In the present exemplary embodiment, the front surface 346a of the first member 346 has, for example, a cylinder-like shape (cylindrical shape) that is defined based on the distance from the object point OP. Note that the front surface 346a of the first member 346 may have another shape that is similar to the cylindrical shape, for example, a free form surface.

For example, when the shortest distance from the object point OP to the holographic photosensitive layer 52 is defined as L and the thickness of the first member 346 is defined as Lg, the radius of curvature of the front surface 346a is defined as L−Lg. In this case, the object light Ls emitted from the object point OP is normally incident on the front surface 346a of the first member 346, as illustrated in FIG. 19.

Here, when the front surface 46a of the first member 46 is a flat surface as in the first exemplary embodiment described above, it is difficult to completely prevent, from changing, the wavefront of the object light Ls that is emitted from the object point OP and has a spherical waveform depending on distance. On the other hand, in the configuration of the present exemplary embodiment, the object light Ls emitted from the object point OP is normally incident on the front surface 346a of the first member 346, and thus the wavefront of the object light Ls incident on the front surface 346a is not affected by refraction. Therefore, with the exposure step of the present exemplary embodiment, the wavefront change of the reference light Lr incident on the holographic photosensitive layer 52 can be minimized. Thus, with the producing method of the present exemplary embodiment, it is possible to perform the exposure of the holographic photosensitive layer 52 with higher accuracy, and thus to produce the first diffraction element 350 having higher diffraction performance.

Note that the present exemplary embodiment describes reduction of effect of refraction on the wavefront of the object light Ls when the distance from the object point OP from which the object light Ls is emitted to the holographic photosensitive layer 52 is finite.

Figure 20:
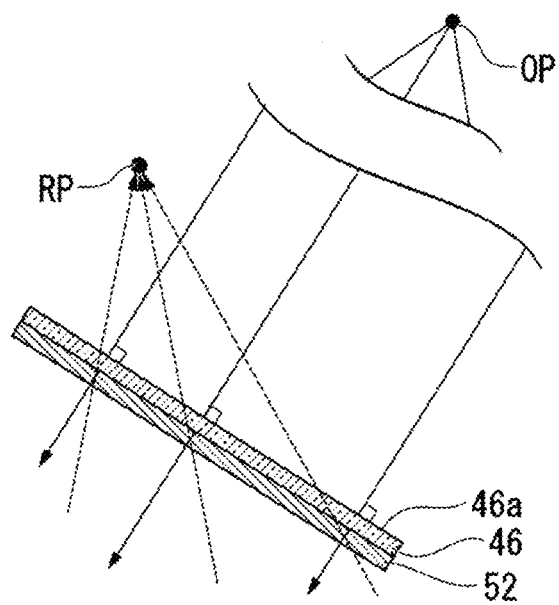
FIG. 20 is a diagram illustrating an exposure step according to a modification example.

However, when the distance from the object point to the holographic photosensitive layer can be considered to be infinite, the wavefront of the object light emitted from the object point becomes parallel. In this case, as illustrated in FIG. 20, even when the first member 46 having the front surface 46a constituted of a flat surface is used as a supporting member, the effect of refraction on the wavefront of the object light Ls is reduced, and thus exposure of the holographic photosensitive layer 52 can be accurately performed.

Fifth Exemplary Embodiment

Next, an optical system according to a fifth exemplary embodiment will be described. In the optical system of the present exemplary embodiment, a case in which a light shielding film is formed in the second member of the correction optical system will be described. Note that components common to the first exemplary embodiment will be given an identical reference numeral and detail description will be omitted.

Figure 21A:
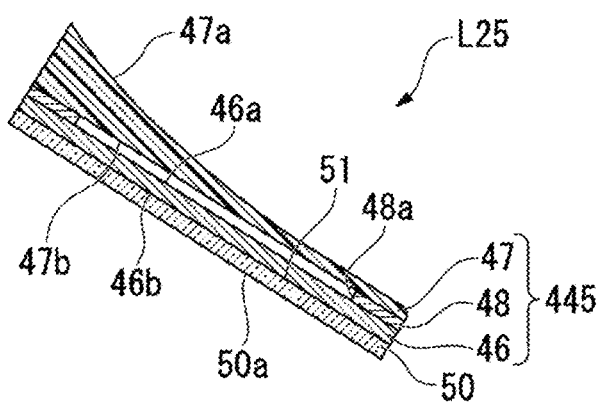
FIG. 21A is a cross-sectional view illustrating a general configuration of a second optical unit in a fifth exemplary embodiment.

FIG. 21A is a cross-sectional view illustrating a general configuration of the second optical unit in the present exemplary embodiment. As illustrated in FIG. 21A, a second optical unit L25 includes the first diffraction element 50 and a correction optical system 445. The correction optical system 445 includes the first member 46, the second member 47, and a light shielding film (light shielding member) 48.

The light shielding film 48 is provided on the back surface 47b of the second member 47. The light shielding film 48 is formed by a black coating film having, for example, light absorbing properties. Note that, as an alternative to a film, the light shielding film 48 may be formed from a black plastic or a black adhesive that can absorb light.

Figure 21B:
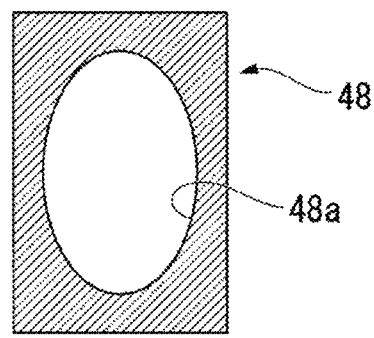
FIG. 21B illustrates a shape of a light shielding film in a plan view.

FIG. 21B illustrates the shape of the light shielding film 48 in a plan view. As illustrated in FIG. 21B, an opening 48a is provided in the light shielding film 48. The opening 48a is sized to block components of the imaging light L0 incident on the first diffraction element 50 or the imaging light L0 diffracted by the first diffraction element 50 that may become stray light. As a result, the second optical unit L25 can transmit, to the subsequent optical systems, imaging light in which stray light components are reduced.

Note that the light shielding film 48 may be provided on the front surface 46a of the first member 46. When the light shielding film 48 is provided on the front surface 46a of the first member 46, the light shielding film 48 may block exposure light during interference exposure of the first diffraction element 50. Thus, after the interference exposure of the first diffraction element 50 is performed, the light shielding film 48 is formed on the front surface 46a of the first member 46.

Sixth Exemplary Embodiment

Next, an optical system according to a sixth exemplary embodiment will be described. In the optical systems in the above-described exemplary embodiments, the case in which the correction optical system corrects the imaging light such that light having the specific wavelength, the light on the short wavelength side, and the light on the long wavelength side are incident on one point on the second diffraction element 70 is described. In the present exemplary embodiment, a case in which incident positions of light having a specific wavelength, light on a short wavelength side, and light on a long wavelength side are slightly different on a second diffraction element 70 is described.

Figure 22:
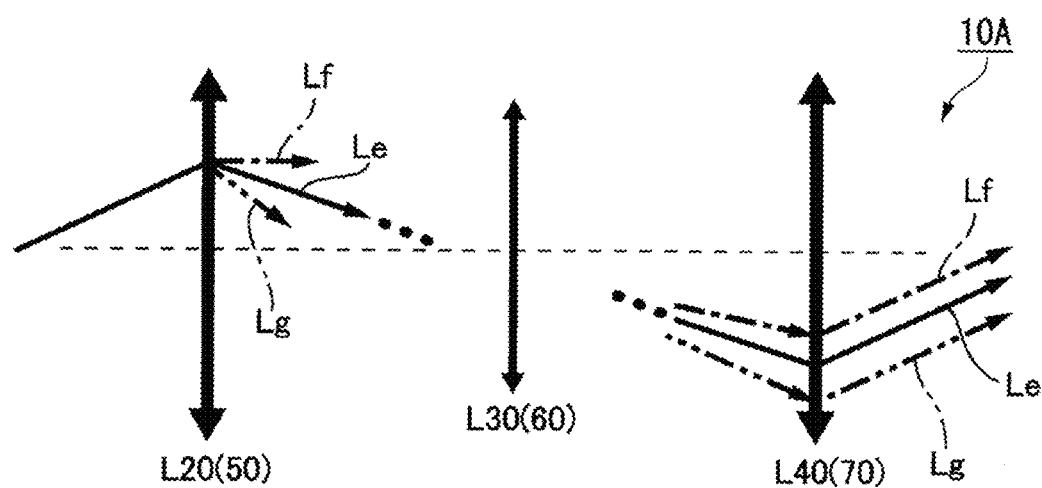
FIG. 22 is a light beam diagram between a first diffraction element and a second diffraction element in an optical system in a sixth exemplary embodiment.
Figure 23:
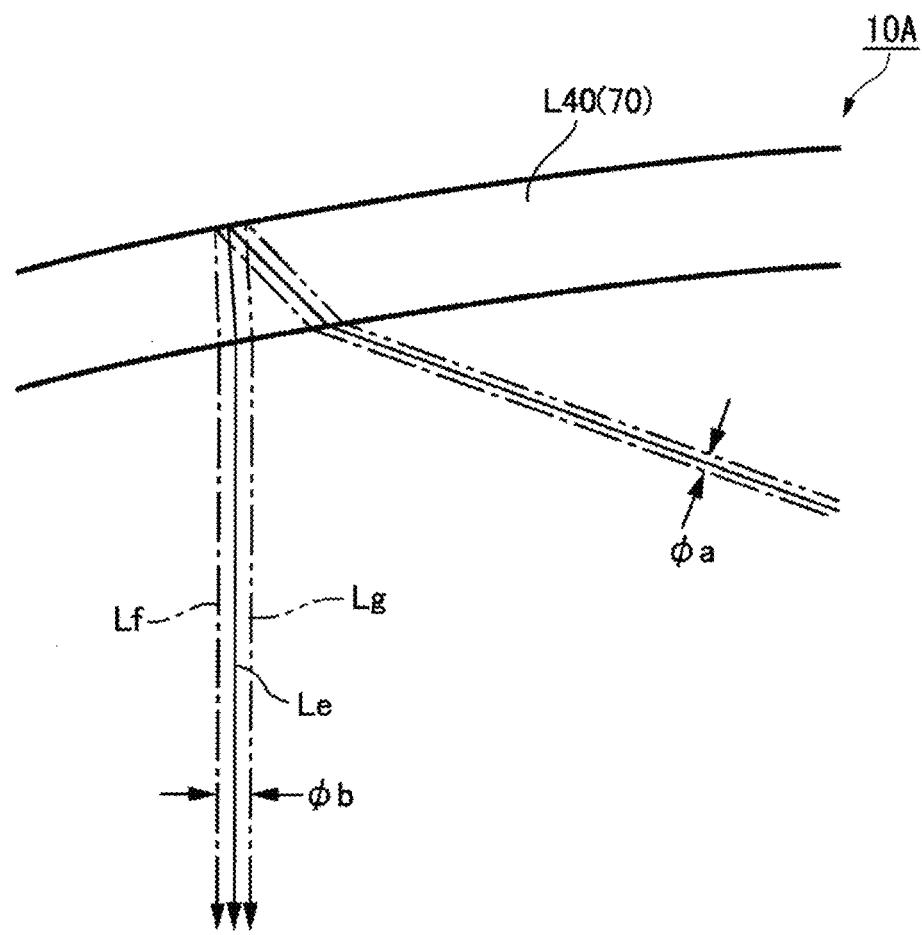
FIG. 23 is a schematic diagram of light emitted from the second diffraction element.
Figure 24:
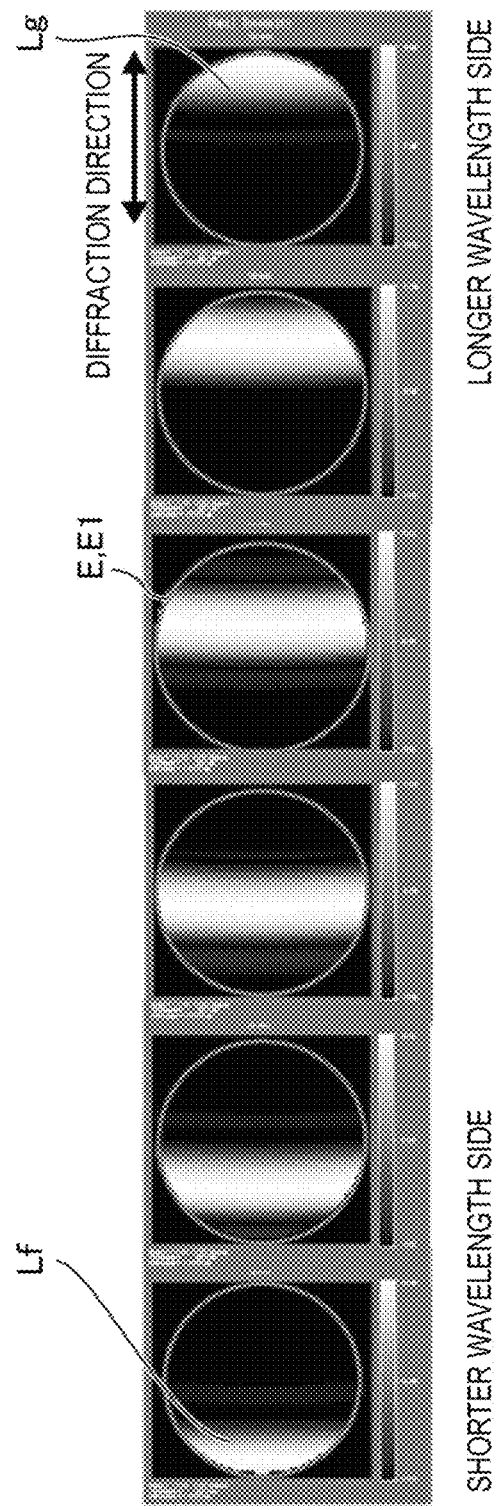
FIG. 24 is a schematic diagram illustrating a state in which the light illustrated in FIG. 23 is incident on an eye.

FIG. 22 is a light beam diagram between the first diffraction element 50 and the second diffraction element 70 in an optical system 10A in the present exemplary embodiment. FIG. 23 is a schematic diagram of light emitted from the second diffraction element 70. FIG. 24 is a schematic diagram illustrating a state in which the light illustrated in FIG. 23 is incident on an eye E. Note that, in FIG. 22, light having a specific wavelength is represented by a solid line Le, light having a wavelength of the specific wavelength −10 nm is represented by a dot-and-dash line Lf, and light having a wavelength of the specific wavelength +10 nm is represented by a two-dot chain line Lg. In FIG. 24, the leftmost picture of the figure illustrates a state in which the light having a wavelength of the specific wavelength −10 nm (the light represented by the dot-and-dash line Lf in FIG. 23) enters the eye E. The rightmost picture of the figure illustrates a state in which the light having a wavelength of the specific wavelength +10 nm (the light represented by the two-dot chain line Lg in FIG. 23) enters the eye E. Pictures between the leftmost and rightmost pictures illustrate states in which light having various wavelengths, from a wavelength of the specific wavelength −10 nm to a wavelength of the specific wavelength +10 nm, enters the eye E. Note that, while light of the specific wavelength incident on the eye E is not illustrated in FIG. 24, light of the specific wavelength incident on the eye E is an intermediate state between the state illustrated third from the left and the state illustrated fourth from the left.

As illustrated in FIG. 23, light in a peripheral wavelength shifted from a specific wavelength enters the second diffraction element 70 in different states. Here, in the second diffraction element 70, as closer to an optical axis, the number of interference fringes is further reduced, and power of bending light is lower. Therefore, when light in a long wavelength side is caused to enter a side close to an optical axis and light in a short wavelength side is caused to enter a side close to an end, light in a specific wavelength and light in a peripheral wavelength are collimated. Consequently, an effect similar to wavelength compensation can be achieved.

In this case, positions of rays of light are different depending on a wavelength, as illustrated in FIG. 23. Therefore, a diameter of rays of light to enter a pupil is increased to a diameter φb from a diameter φa. FIG. 24 illustrates the states of light beam intensity incident on the pupil at that time. As clearly seen from FIG. 24, the pupil cannot be filled near the specific wavelength, but the light having the peripheral wavelength can fill the pupil diameter since the light having the peripheral wavelength is incident on a position deviated from that of the light having the specific wavelength. As a result, it is possible to provide, to an observer, advantages, for example, improved visibility of an image.

Hereinbefore, the exemplary embodiment according to the display device of the present disclosure is described, but the present disclosure is not limited to the above exemplary embodiment, and is appropriately changeable without departing from the gist of the disclosure.

For example, in the exemplary embodiments described above, an example is given of the case in which the second diffraction angle of the imaging light L0 at the second diffraction element 70 is greater than the first diffraction angle of the imaging light L0 at the first diffraction element 50. However, the present disclosure is not limited to this example. In other words, in the present disclosure, it is sufficient that the second diffraction angle of the second diffraction element 70 and the first diffraction angle of the first diffraction element 50 are different from each other, and the first diffraction angle may be greater than the second diffraction angle. In this way, even when the first diffraction angle is greater than the second diffraction angle, by providing the correction optical system, the size reduction of the display device can be achieved while appropriately performing wavelength compensation by the two diffraction elements.

Further, in the exemplary embodiments described above, the case in which the correction optical system 45 has all the functions illustrated in FIGS. 12A to 12C is described as an example. However, the correction optical system according to the present disclosure may include at least any of the functions.

Furthermore, in the optical systems in the exemplary embodiments described above, the correction optical system is used to solve problems that arises when the diffraction angles of the first diffraction element 50 and the second diffraction element 70 are different. However, the use of the correction optical system is not limited thereto.

Here, when the diffraction angles of the first diffraction element 50 and the second diffraction element 70 are the same, a conjugated relationship or a substantially conjugated relationship is established between the first diffraction element 50 and the second diffraction element 70.

When a conjugated relationship or a substantially conjugated relationship is established between the first diffraction element 50 and the second diffraction element 70, divergent light rays emitted from a first point of the first diffraction element 50 are collected by the light-guiding system 60 having positive power, and are incident at a second point of the second diffraction element 70 that corresponds to the first point.

Accordingly, when the first diffraction element 50 and the second diffraction element 70 satisfy a conjugated relationship or a substantially conjugated relationship, chromatic aberration caused by diffraction generated by the second diffraction element 70 can be compensated by the first diffraction element 50.

Incidentally, the display device 100 has a structure in which the imaging light L0 is incident from the oblique direction (obliquely incident) on the second diffraction element 70. When the imaging light L0 is obliquely incident on the second diffraction element 70 in this way, the ray shape of the imaging light L0 on the second diffraction element 70 is distorted.

Thus, the ray shape of the imaging light incident on the eye E of the observer differs from the shape of the imaging light ray of the imaging light incident on the first diffraction element 50 and the second diffraction element 70, and thus it is difficult to satisfy the above-described conjugated relationship or substantially conjugated relationship.

For example, when the light ray shape of the imaging light L0 obliquely incident on the second diffraction element 70 can be corrected to a desired light ray shape such as a circular shape in advance, shapes of the imaging light incident on the first diffraction element 50 and the second diffraction element 70 become the same, and as a result, a conjugated relationship or a substantially conjugated relationship between the first diffraction element 50 and the second diffraction element 70 is established. The correction optical system 45 can be effectively used as a means for correcting the light ray shape of the imaging light L0.

Note that the oblique incidence of the imaging light L0 with respect to the second diffraction element 70, as described above, occurs even when the first diffraction element 50 and the second diffraction element 70 do not have a conjugated relationship. Regardless of whether there is a conjugated relationship, the correction optical system 45 can be used as a means for correcting the light ray shape of the imaging light L0 obliquely incident on the second diffraction element 70.

Modification Example

Figure 25:
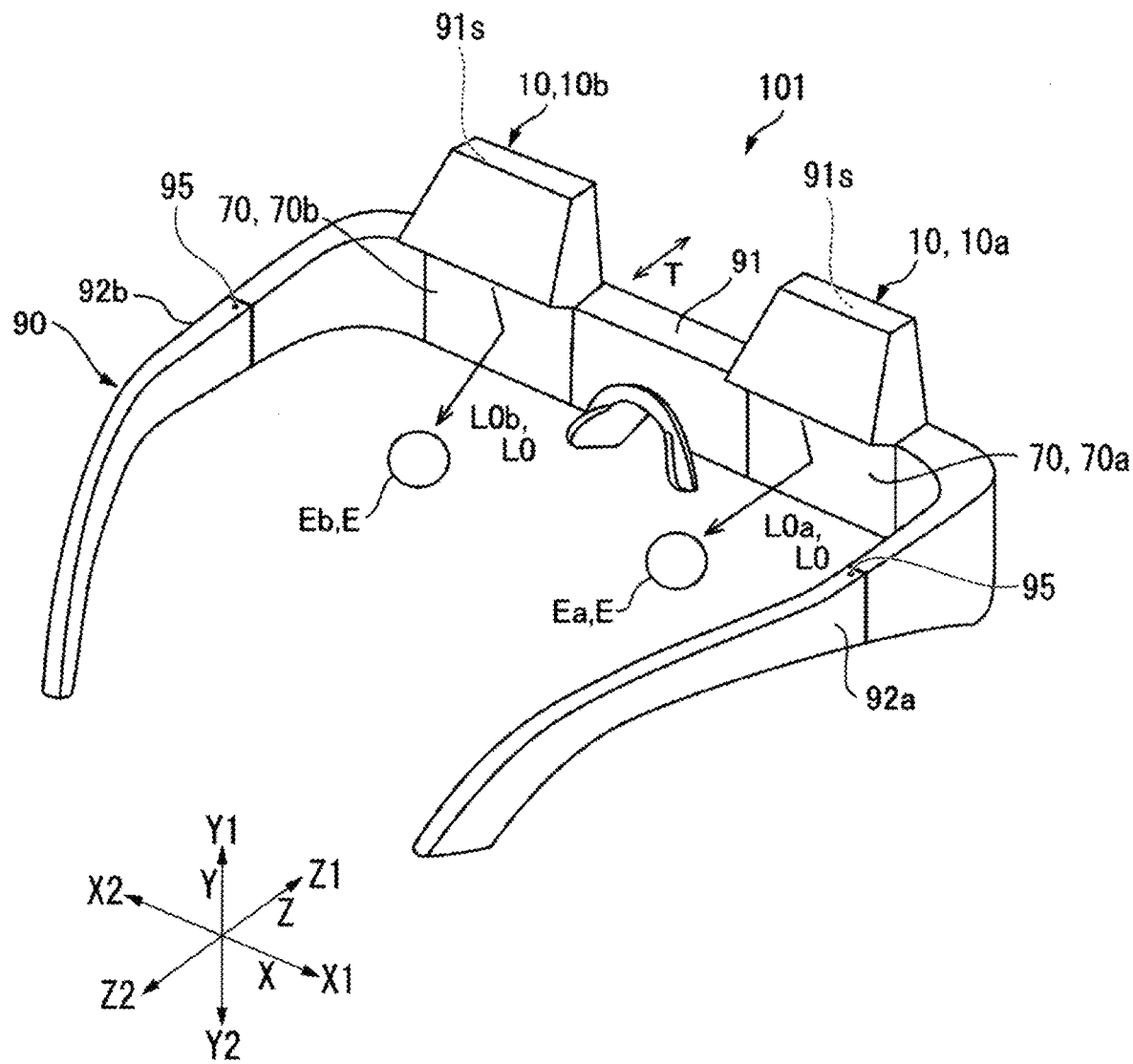
FIG. 25 is a configuration diagram of a display device according to a modification example.

FIG. 25 is a configuration diagram of a display device 101 according to a modification example. As illustrated in FIG. 25, the display device 101 in the modification example includes the right-eye optical system 10a that causes the imaging light L0a to be incident on the right eye Ea, the left-eye optical system 10b that causes the imaging light L0b to be incident on the left eye Eb, and the frame 90 that holds the right-eye optical system 10a and the left-eye optical system 10b.

The display device 101 in the present modification example has a configuration in which the imaging light L0 travels from the up side Y1 to the down side Y2 in the right-eye optical system 10a and the left-eye optical system 10b, and is thus emitted to an eye E of an observer.

The display device 101 in the present modification example also includes the above-described optical system 10. Thus, the display device 101 in the present modification example can also achieve the size reduction of the device while appropriately performing wavelength compensation by two diffraction elements.

In the exemplary embodiments described above, the optical element according to the present disclosure is applied to the configuration of the second optical unit L20. However, the optical element according to the present disclosure may be applied to the configuration of the fourth optical unit L40. In this case, the second diffraction element constituting the fourth optical unit L40 includes a first member that is transmissive and has an elastic modulus of 50 GPa or greater, and a second member that is transmissive and has optical power.

APPLICATION TO OTHER DISPLAY DEVICE

In the exemplary embodiments described above, the head-mounted display device 100 is exemplified, but the present disclosure may be applied to a head-up display, a handheld display, a projector optical system, and the like.

What is claimed is:

1. A display device, comprising:
a first optical unit having positive power;
a second optical unit including a first diffraction element and having positive power;
a third optical unit having positive power; and
a fourth optical unit including a second diffraction element and having positive power, the first to fourth optical units being provided along an optical path of imaging light emitted from an imaging light generating device, wherein
the second optical unit further includes a first member provided at one surface side of the first diffraction element, and a second member provided on a side of the first member opposite to a side where the first diffraction element is located,
the first member is transmissive and has an elastic modulus of 50 GPa or greater, and
the second member is transmissive and has optical power.

2. The display device according to claim 1, wherein the first member is formed from glass.

3. The display device according to claim 1, wherein a surface of the first member facing the second member is a flat surface.

4. The display device according to claim 1, wherein a gap is formed between the first member and the second member.

5. The display device according to claim 4, further comprising a spacer member forming a gap between the first member and the second member.

6. The display device according to claim 5, wherein the spacer member includes a first spacer portion and a second spacer portion, and
each of the first spacer portion and the second spacer portion is formed from a different material.

7. The display device according to claim 1, wherein the second member includes a light shielding member provided at a surface of the second member facing the first member.

* * * * *